United States Patent
Jiang et al.

(10) Patent No.: US 9,979,835 B1
(45) Date of Patent: May 22, 2018

(54) CUSTOMIZATION OF TRAFFIC CONTROL SERVICES

(71) Applicant: Verizon Patent and Licensing Inc., Arlington, VA (US)

(72) Inventors: Xiaoxiao Jiang, Stoneham, MA (US); Vikram Siwach, Carlisle, MA (US); Damascene M. Joachimpillai, Westford, MA (US); Li Zhao, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 15/417,298

(22) Filed: Jan. 27, 2017

(51) Int. Cl.
- *H04M 11/00* (2006.01)
- *H04M 15/00* (2006.01)
- *H04M 1/725* (2006.01)

(52) U.S. Cl.
CPC ..... *H04M 15/723* (2013.01); *H04M 1/72563* (2013.01); *H04M 15/39* (2013.01); *H04M 15/59* (2013.01); *H04M 15/61* (2013.01); *H04M 15/885* (2013.01)

(58) Field of Classification Search
CPC ... H04M 2215/32; H04W 4/24; H04W 12/12; H04W 12/06; H04W 64/00; H04W 4/02; H04L 63/08
See application file for complete search history.

(56) References Cited

U.S. PATENT DOCUMENTS

| | | | | |
|---|---|---|---|---|
| 6,301,471 B1* | 10/2001 | Dahm | .................. | H04M 15/00 379/114.1 |
| 8,355,413 B2* | 1/2013 | Vasamsetti | ............ | H04W 28/24 370/389 |
| 9,736,759 B2* | 8/2017 | Zhan | ..................... | H04W 24/08 |
| 9,794,871 B2* | 10/2017 | Lambert | ............... | H04W 48/18 |
| 2011/0264726 A1* | 10/2011 | Zabawskyj | ............. | H04L 12/14 709/203 |
| 2012/0157047 A1* | 6/2012 | Chen | ....................... | H04L 63/08 455/411 |
| 2014/0086052 A1* | 3/2014 | Cai | ........................ | H04L 47/748 370/235 |
| 2015/0078288 A1* | 3/2015 | Sanyal | ................ | H04W 76/022 370/329 |
| 2016/0007394 A1* | 1/2016 | Hassan | ............... | H04W 76/022 455/450 |
| 2017/0366433 A1* | 12/2017 | Raleigh | ................... | H04W 4/24 |
| 2018/0020354 A1* | 1/2018 | Felt | ........................ | H04W 12/06 |

* cited by examiner

*Primary Examiner* — Dai A Phuong

(57) ABSTRACT

A method, a device, and a non-transitory storage medium to provide a user interface that allows a user to configure a traffic control service, the traffic control service including at least one of a content-based service, an application-based service, a time-based service, a location-based service, or a quality-of-service-based service; receive, via the user interface, selections of parameters that govern the traffic control service, and a unique identifier of an end user to which the traffic control service pertains; configure the traffic control service in a line card of a network device included in the data path, wherein the configuration includes the rules data and the unique identifier in the line card, and the traffic control service that includes an in-line quota enforcement service and a charging record service.

20 Claims, 23 Drawing Sheets

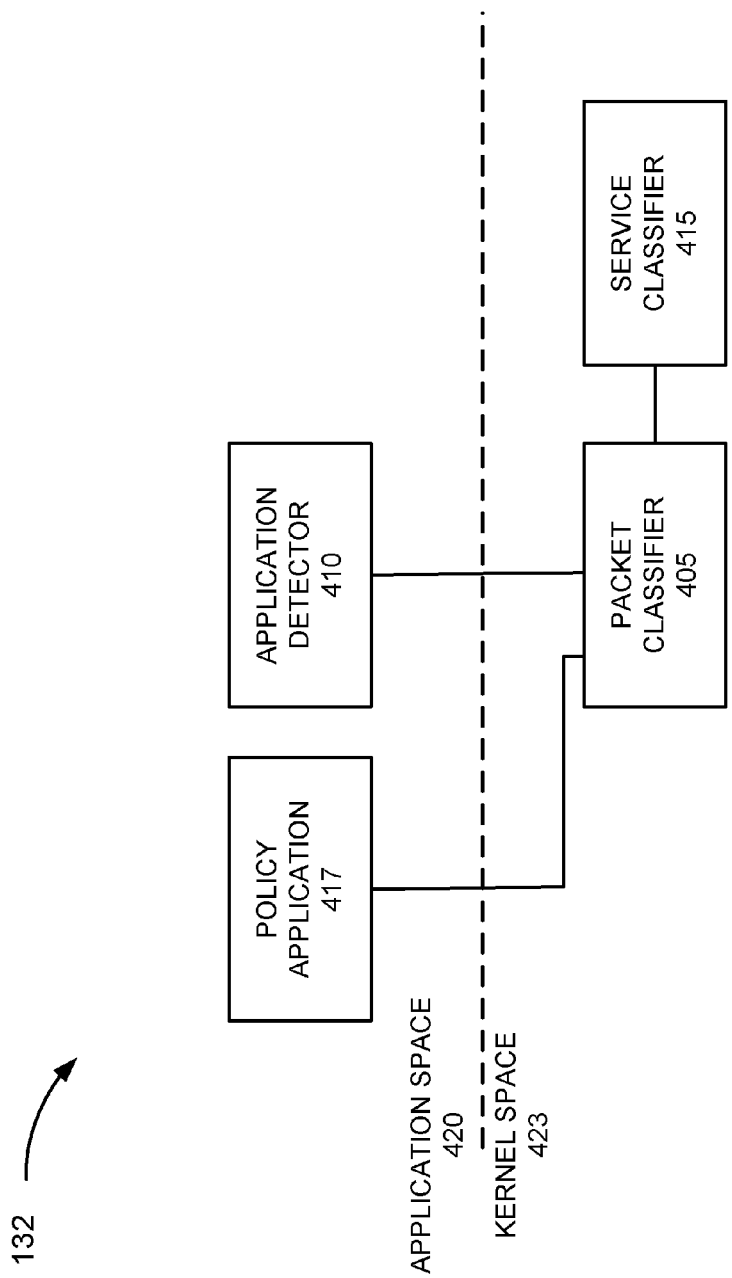

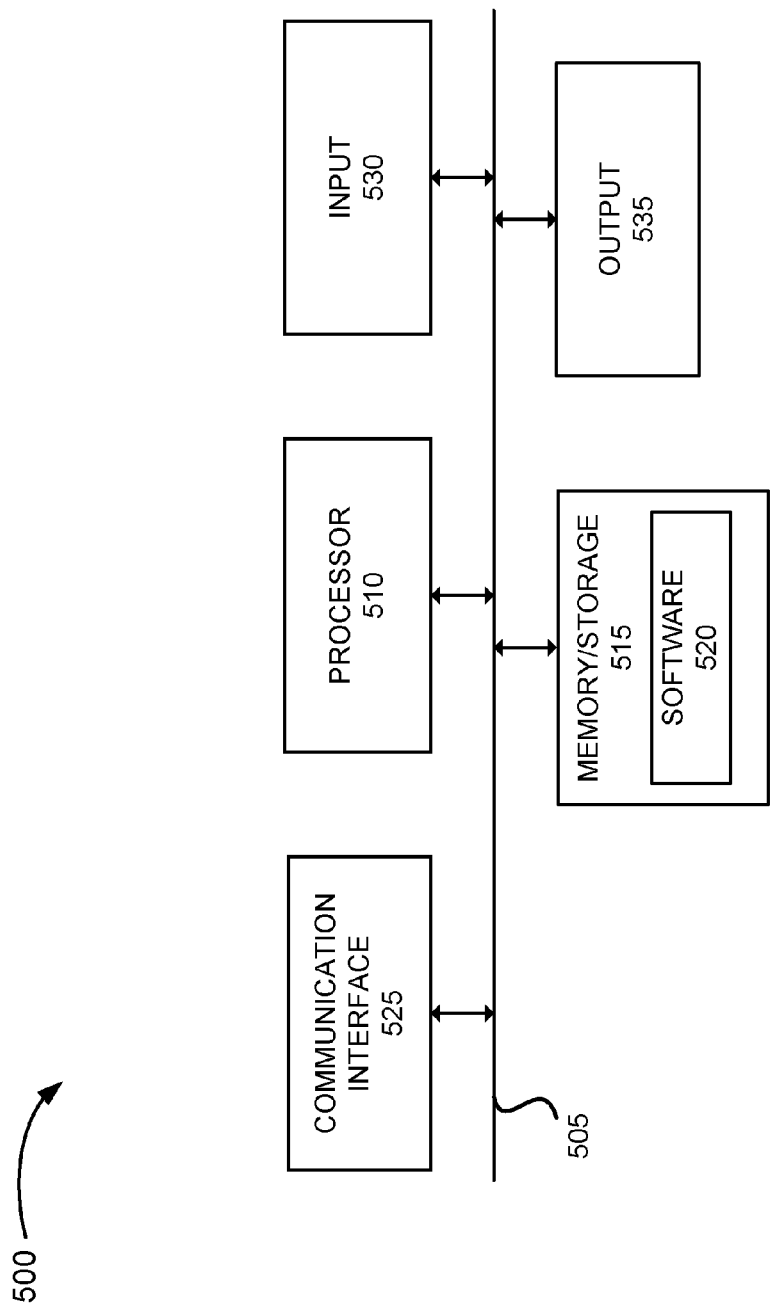

| MDN | LOCATION | MULTIPLIER | ALLOWANCE |
|---|---|---|---|
| 703-555-5555 | BOSTON | 1 | 1 GB |
| | FENWAY PARK | 0 | UNLIMITED |
| | RESTAURANTS | .5 | 4 GB |
| | * | 1 | 4 GB |
| ↑1038 | ↑1040 | ↑1042 | ↑1044 |

Fig. 10C

CUSTOMIZATION OF TRAFFIC CONTROL SERVICES

BACKGROUND

Service providers manage various backend services, such as traffic control, when providing communication-related services to their users. For example, records are generated to reflect usage accrued by the users because of their use of the provided services. Depending on the service, the service provider, and the number of users, the amount of data pertaining to traffic control can be massive and the processing of such data can be complex.

BRIEF DESCRIPTION OF THE DRAWINGS

FIGS. 4A-4C are diagrams illustrating exemplary components of an infrastructure layer included in the traffic control platform;

FIG. 5 is a diagram illustrating exemplary components of a device that may correspond to one or more of the devices illustrated herein;

FIGS. 10A-10D are diagrams illustrating exemplary configuration data pertaining to exemplary embodiments of the traffic control service.

DETAILED DESCRIPTION OF PREFERRED EMBODIMENTS

Figure 1:
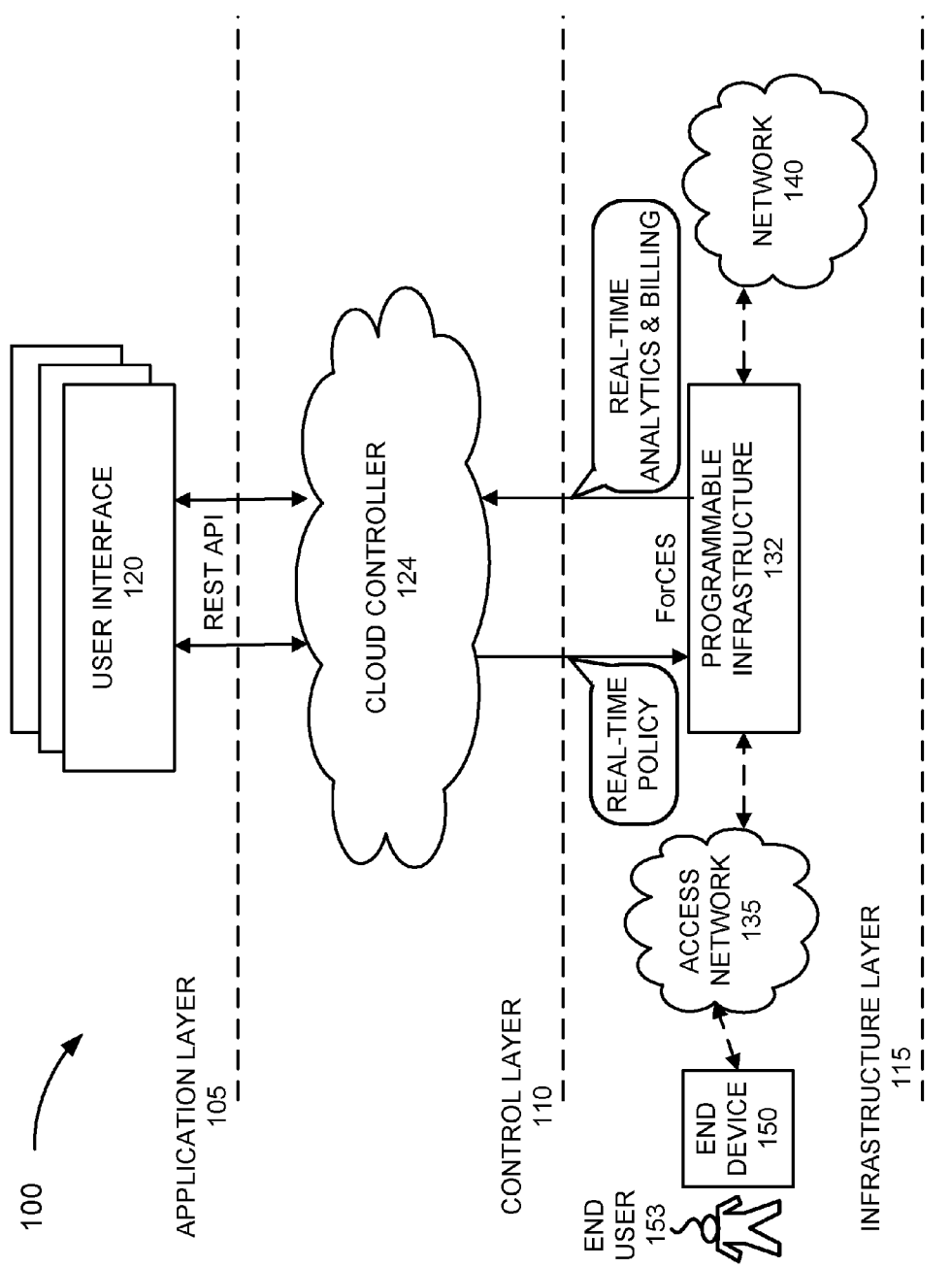
FIG. 1 is a diagram illustrating an exemplary environment in which an exemplary embodiment of a traffic control service may be implemented.

The following detailed description refers to the accompanying drawings. The same reference numbers in different drawings may identify the same or similar elements. Also, the following detailed description does not limit the invention.

Typically, the acquisition, storage, and post-processing of traffic control data or traffic control records involve several network devices. As a consequence, a traffic control process may generate a massive amount of duplicate information, which not only can increase cost (e.g., data storage, interfaces, etc.), but also introduces operation and maintenance overhead. For example, in a wireless network environment (e.g., a Long Term Evolution (LTE) network, an LTE-Advanced (LTE-A) network, etc.), various network devices (e.g., a packet data network gateway (PGW), a policy and charging enforcement function (PCEF), an offline charging system (OFCS), an online charging system (OCS), a billing system, etc.) and various interfaces (e.g., Gx, Gy, Ro, Rc, Re, Rf, etc.) are used to provide a billing service. Also, current billing system architectures are unable to provide real-time billing services to users (e.g., administrators, customers, subscribers, etc.) due to various delays inherently caused by the billing process. For example, an Rf interface feed included in a billing system may not report data usage, which pertains to subscribers, to a billing device for several hours after the data usage occurred. In this regard, administrators and subscribers may be hindered when monitoring and managing data usage. Further, current traffic control architectures are unable to invoke rule changes or services in real-time at the data path level.

Typically, traffic control systems track data usage without regard to the type of content. For example, traffic control systems may track data usage of an end user regardless of whether the end user is streaming video from YouTube versus Netflix. According to exemplary embodiments, a content-based service is described. According to exemplary implementations, under the content-based service, traffic control services, such as quota or data usage enforcement, provide different treatments to different types of contents. According to exemplary implementations, treatment of content includes an allowance and a multiplier. For example, the allowance indicates how much data the end user may desire under the content-based service (e.g., 2 GB, 4 GB, etc), while the multiplier may indicate how to count the data usage. For example, the multiplier may indicate a percentage or a scalar value. In this way, the multiplier may be used to account for or treat different parameters associated with data usage. By way of further example, only a percentage (e.g., 50%, 25%) or a fraction (e.g., 0.10, 0.35, etc.) of data usage may count relative to the allowance, based on the type of content, the type of application, etc. Additionally, the multiplier may be correlated with other metrics (e.g., data rate, Quality-of-Service, etc.) of the data usage, and the type of content, the type of application, etc.

Typically, traffic control systems track data usage without regard to the location of the end user. For example, traffic control systems may track data usage of an end user regardless of whether the end user is at home, in a public place, at work, or other location. According to exemplary embodiments, a location-based service is described. According to exemplary implementations, under the location-based service, traffic control services, such as quota or data usage enforcement, provide different treatments to different locations. According to exemplary implementations, treatment of a location includes an allowance and a multiplier. For example, the allowance indicates how much data the end user may desire under the location-based service, while the multiplier may indicate how to count the data usage. In this way, the multiplier may be used to account for or treat different parameters associated with data usage or other metrics, which may be correlated to different locations, types of locations, etc.

Typically, traffic control systems track data usage without regard to the time. For example, traffic control systems may track data usage of an end user regardless of whether it is in the morning, the afternoon, or the evening. According to exemplary embodiments, a time-based service is described. According to exemplary implementations, under the time-based service, traffic control services, such as quota or data usage enforcement, provide different treatments to different periods of time. According to exemplary implementations, treatment of a time includes an allowance and a multiplier. For example, the allowance indicates how much data the end user may desire under the time-based service, while the multiplier may indicate how to count the data usage. In this way, the multiplier may be used to account for or treat different parameters associated with data usage or other metrics, which may be correlated to time periods Typically, data services provide a static data rate to an end user. For example, the end user is provided the same data rate regardless of whether the end user is accessing e-mail or streaming a movie. According to exemplary embodiments, a QoS-based service is described. According to exemplary implementations, under the QoS-based service, traffic control services can adjust the data rate or traffic speed based on the type of traffic, the type of application, the location, and/or the time.

According to exemplary embodiments, a traffic control platform is described. According to an exemplary embodiment, the traffic control platform includes a multi-layer system that includes an application layer, a control layer, and an infrastructure layer. According to an exemplary implementation, the traffic control platform uses a software defined networking (SDN) model. According to various embodiments, one or more of the layers may operate on various planes of an environment. For example, the various planes may include a data plane, a control plane, a management plane, and/or other planes implemented within the environment.

The application layer generates and provisions a traffic control service to the control layer using Representational State Transfer (REST) Application Programming Interfaces (APIs). According to an exemplary implementation, the application layer includes an end device that allows a user, via a user interface, to provision the control layer. As used herein, the term "user" is intended to be broadly interpreted to include a user associated with or acting on behalf of a service provider, a network operator, or other network-side entity (e.g., a network administrator, a service provider administrator, etc.) or an end user that uses the traffic control services (e.g., a customer, a subscriber, or the user operating the end device).

According to exemplary embodiments, the user can provision the content-based service plan, the location-based service plan, the time-based service plan, and the QoS-based service plan, as described herein.

The control layer provides overall control of the traffic control platform. For example, the control layer configures the infrastructure layer in real-time to provide the traffic control service based on the provisioning of the application layer. The control layer may parse traffic control policies, and convert the traffic control policies into rules that can be used by the infrastructure layer to govern various data flows (e.g., end user data traffic) that pertain to the traffic control service. According to an exemplary implementation, the control layer is implemented as a centralized controller that is stateless and scalable, such that multiple controller instances may be deployed and each controller instance may independently manage traffic control policies and configure the traffic control polices at the infrastructure layer (e.g., the data paths) for enforcement. According to an exemplary implementation, the control layer includes a distributed database and uses scripting language.

The infrastructure layer operates based on traffic control policies and real-time analytics to provide the traffic control service. For example, the infrastructure layer enforces the traffic control policies on subscriber data traffic on a per packet basis. According to an exemplary implementation, the infrastructure layer includes a packet classifier. The packet classifier may identify an end device and/or an end user associated with a packet, and may determine a service from among multiple services that the packet may pertain.

According to an exemplary implementation, the infrastructure layer includes a service classifier. The service classifier may manage various metrics pertaining to the packet and the determined service. For example, the service classifier may control the data traffic speed, monitor data usage and determine whether current data usage exceeds a quota limit, and drop the packet or charge the subscriber for overage usage when the current usage exceeds the quota limit. According to an exemplary implementation, the packet classifier and the service classifier each operates in Kernel space.

According to an exemplary implementation, the infrastructure layer includes an application detector. The application detector may determine the service, from among multiple services, to which the packet pertains and that the packet classifier is unable to identify. According to an exemplary implementation, the application detector operates in user space or application space.

FIG. 1 is a diagram illustrating an exemplary environment 100 in which an exemplary embodiment of a traffic control platform be implemented. As illustrated, environment 100 includes a multi-layered system that includes an application layer 105, a control layer 110, and an infrastructure layer 115. As further illustrated, application layer 105 includes a user interface 120. Control layer 110 includes a cloud controller 124. Infrastructure layer 115 includes a programmable infrastructure 132. Access network 135, network 140, and end device 150 are exemplary elements included in a data path to which the traffic control service of programmable infrastructure 132 applies. An end user 153 is a person that operates end device 150. For example, end user 153 may be a subscriber or a customer of a service provider that is subject to the traffic control service.

The number and arrangement of devices in environment 100 are exemplary. According to other embodiments, environment 100 may include additional devices and/or differently arranged devices, than those illustrated in FIG. 1.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

Figure 2:
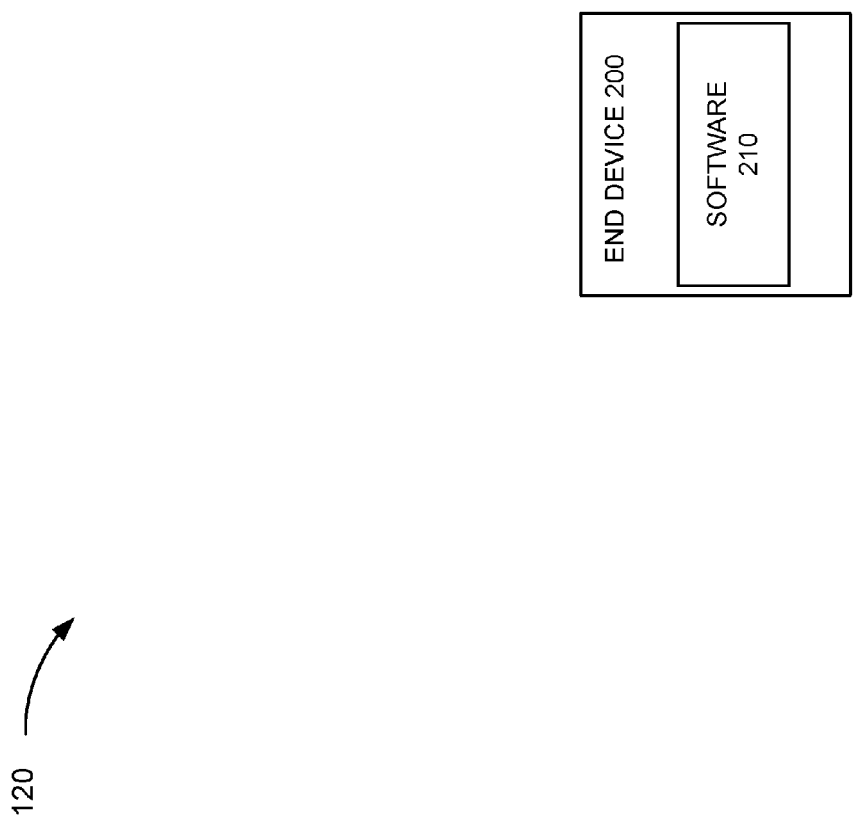
FIG. 2 is a diagram illustrating exemplary components of an application layer included in the traffic control platform.

Application layer 105 generates and provisions a traffic control service. According to an exemplary implementation, application layer 105 includes a user interface 120 that allows a user (e.g., an administrator, a customer) to provision control layer 110 using REST APIs. For example, user interface 120 may provide an interactive interface environment that allows the user to configure various settings that govern the operation of the traffic control service. By way of further example, referring to FIG. 2, user interface 120 may include an end device 200, which further includes software 210. End device 200 may be implemented as a computer (e.g., a desktop, a laptop, etc.) or other computational device. Software 210 may include one or multiple applications that allow the user (not shown) to configure various settings of the traffic control service. For example, software 210 may include a client (e.g., a web browser, a mobile application, a computer application, etc.) that allows the user to access and log onto a server (e.g., an administrative portal, a JavaScript Object Notation (JSON) server, etc.) of control layer 110. Upon successfully logging in, the server may provide RESTful services that allow the user to configure various components of control layer 110. For example, the user may configure various components of cloud controller 124 via user interface 120 (e.g., end device 200 and software 210) and the server. For example, as described herein, the user may configure via user interface 120 a centralized database, a data engine, and other components that may manage various functions (e.g., policies, analytics, billing, etc.) that support the traffic control service and, in turn, provide service customization.

According to exemplary embodiments, the user (e.g., an administrator, a subscriber, a customer, an end user, etc.) can provision the content-based service, the location-based service, the time-based service, and the QoS-based service, as described herein. With reference to the content-based service, according to exemplary implementations, the user may configure the allowance, the multiplier, the metric (e.g., data usage, data rate, etc.) and, different contents, content types, applications, and/or application types. For example, the user may specify a type of application (e.g., a streaming application, an e-mail application, an instant messaging application, a texting application, a real-time application, a web browsing application, etc.), an application (e.g., Microsoft Media Player, Microsoft Outlook, Skype, Internet Explorer, etc.), a type of content (e.g., advertising content, a web page, a video, e-mail, music, movie, etc.), and/or content (e.g., a television series (e.g., The Affair, Westworld, etc.), music of a particular group (e.g., Led Zepplin, Usher, etc.), a particular web site (e.g., Microsoft News (MSN), Netflix, Facebook, Youtube, etc.).)

With reference to the location-based service, according to exemplary implementations, the user may configure the allowance, the multiplier, the metric and, different locations. For example, the user may specify a particular location (e.g., home, place of work, Fenway park, a city (e.g., Boston, New York City), a state (e.g., Massachusetts, New York, Virginia, etc.), and/or a category of a location (e.g., restaurants, bars, parks, museums, airports, etc.).

With reference to the time-based service, according to exemplary implementations, the user may configure the allowance, the multiplier, the metric and, a time period. For example, the user may specify a day (e.g., Monday, Saturday-Sunday, etc.), a time period (e.g., 1:00 pm-4:00 pm), a date (e.g., Jan. 21, 2017, Feb. 1, 2017-Feb. 3, 2017), other time window (e.g., first week in March, daytime, nighttime, etc.), and/or some combination thereof.

With reference to the QoS-based service, according to exemplary implementations, the user may configure the allowance, the multiplier, the data rate and, one or multiple other variables (e.g., time, location, content, etc.). According to other embodiments, the time-based service, the content-based service, the location-based service, etc., may be combined in various manners. For example, a time and location-based service, a location and content-based service, or other combinations that correlates to the allowance, the multiplier, and/or metric may be combined.

Referring to back to FIG. 1, control layer 110 provides overall control of the traffic control platform. For example, control layer 110 configures infrastructure layer 115 in real-time to provide the traffic control service based on the provisioning parameters received from application layer 105. Control layer 110 includes interfaces to communicate with application layer 105 and infrastructure layer 115, as described herein.

Cloud controller 124 may be implemented as a centralized control system. Although not illustrated as a part of control layer 110, a billing domain may or may not be a part of control layer 110. The billing domain may include a network device that manages the billing of customers based on the receipt of traffic control information generated by cloud controller 124. The billing domain may provide billing mediation (e.g., inter-operator accounting), billing, and statistics. For example, cloud controller 124 may transmit unified billing records to the billing domain, which in turn, may be processed and billed (e.g., bills are generated and sent) to end user 153 (e.g., a subscriber) for data usage.

Figure 3:
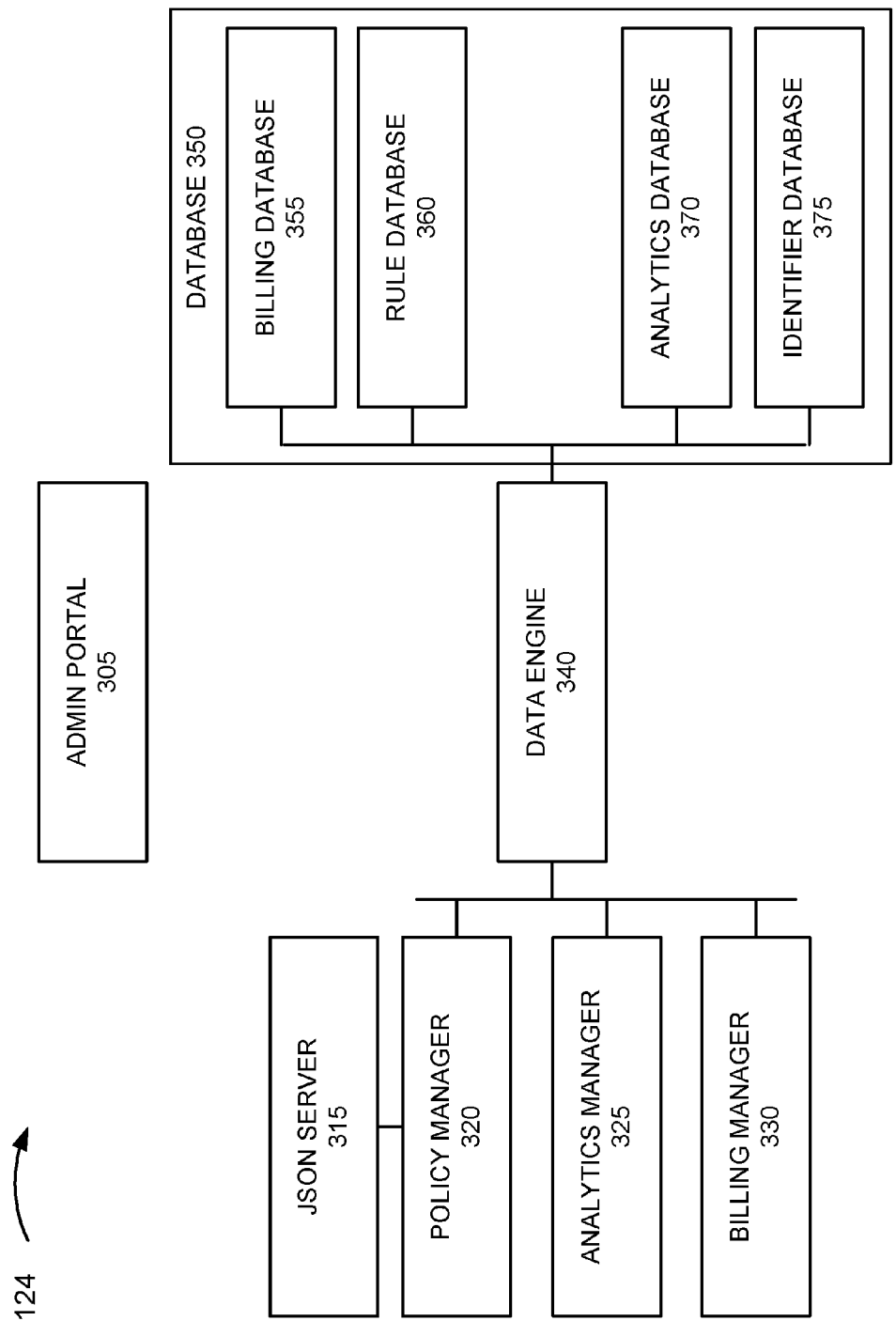
FIG. 3 is a diagram illustrating exemplary components of a control layer included in the traffic control platform.

Referring to FIG. 3, according to an exemplary implementation, cloud controller 124 includes an administrative portal 305, a JSON server 315, a policy manager 320, an analytics manager 325, a billing manager 330, a data engine 340, and a database 350. Database 350 may include a billing database 355, a rule database 360, an analytics data base 370, and an identifier database 375. According to other exemplary implementations, cloud controller 124 may include additional, fewer, and/or different components than those illustrated in FIG. 3 and described herein. Additionally, multiple components may be combined into a single component. Additionally, or alternatively, a single component may be implemented as multiple components in which a process or a function may be collaboratively performed or multiple processes or functions may be split between them. According to various implementations, one or more of the components may operate on various planes of environment 100. For example, the various planes may include a data plane, a control plane, a management plane, and/or other planes implemented within environment 100. Administrative portal 305, JSON server 315, policy manager 320, analytics manager 325, billing manager 330, data engine 340, and database 350 each includes logic that support the traffic control service, as described herein. The communicative links illustrated are exemplary.

Administrative portal 305 includes a network device that provides a portal service. The portal service allows a user (e.g., a network administrator, a subscriber, a customer, etc.) to configure the traffic control service. The traffic control service may include the time-based service, the location-based service, etc., as described herein. The traffic control service may include other traffic services (e.g., a quota enforcement service, a packet dropper service, a data rate service, etc.), as described herein. According to an exemplary implementation, administrative portal 305 may be implemented as a web server. Administrative portal 305 may provide a login service that prevents unauthorized use.

JSON server 315 includes a network device that provides a provisioning service of the traffic control service. JSON server 315 includes an API layer of the cloud controller 124. According to an exemplary implementation, JSON server 315 includes logic that parses policy JSON objects received from application layer 105 via the REST API, converts the JSON objects into rules and/or parameters, and validates the rules and/or parameters of the traffic control service. According to an exemplary implementation, JSON server 315 includes logic that converts the JSON objects into Linux Kernel operations. According to other exemplary implementations, JSON server 315 may include logic that converts the JSON objects into another operating system form. JSON server 315 may pass the rules and/or parameters to policy manager 320. JSON server 315 may also store the rules and/or parameters in database 350 (e.g., rule database 360) via data engine 340.

Policy manager 320 includes a network device that provides a configuration service of the traffic control service. According to an exemplary implementation, policy manager 320 includes logic that obtains the rules and/or parameters from JSON server 315, and provides real-time programming of infrastructure layer 115 via a Forwarding and Control Element Separation (ForCES) interface.

Analytics manager 325 includes a network device that provides an analytics service of the traffic control service. According to an exemplary implementation, analytics manager 325 includes logic that receives traffic control information via a control plane with infrastructure layer 115. For example, analytics manager 325 may receive traffic control information that includes analytic reports from an application detector in the data path of infrastructure layer 115, as described herein. According to an exemplary implementation, analytics manager 325 includes logic that places the analytic reports into a queue (not illustrated), which may be subsequently transmitted to database 350 (e.g., analytics database 370) for storage. The queue may store the analytic reports by topic based on input from analytics manager 325.

Billing manager 330 includes a network device that provides a charging service of the traffic control service. According to an exemplary implementation, billing manager 330 includes logic that receives traffic control information via a control plane with infrastructure layer 115. For example, billing manager 330 may receive traffic control information that includes charging reports from a service classifier in the data path of infrastructure layer 115, as described herein. According to an exemplary implementation, billing manager 330 includes logic that places the charging reports into a queue (not illustrated), which may be subsequently transmitted to database 350 (e.g., billing database 355) for storage. The queue may store the charging reports by topic based on input from billing manager 330. For example, charging data records (CDRs) or charging files may be filtered based CDR type, CDR parameters, originating CDR, etc.

Data engine 340 includes a network device that provides a control service of the traffic control service. According to an exemplary implementation, data engine 340 includes logic that processes the traffic control information (e.g., analytics reports) received from analytics manager 325, and traffic control information (e.g., charging reports) received billing manager 330. For example, data engine 340 includes logic that generates alerts and notifications to inform users (e.g., network administrators, subscribers, etc.) about data usage. By way of further example, the alert can be triggered when a subscriber's data usage is close to his/her data usage limit. Data engine 340 includes logic that obtains the traffic control information (e.g., analytic records and the charging records) from the queues, and transmits these records for storage in database 350 (e.g., billing database 355 and analytics database 370). Data engine 340 includes logic that retrieves data from database 350. For example, a user via application layer 105 may query or obtain data stored in database 350.

Database 350 includes a network device that stores data used to provide the traffic control service. As previously mentioned, according to an exemplary implementation, database 350 includes billing database 355, rule database 360, analytics database 370, and identifier database 375. According to other exemplary implementations, database 350 may include additional, different, and/or fewer databases. For example, according to other exemplary embodiments, database 350 may not include identifier database 375. Alternatively, according to other exemplary embodiments, two or more databases or portions thereof may be combined. For example, identifier database 375 may be combined with rule database 360.

A database may operate based on a database management system (DBMS). The DBMS may be implemented using conventional, well-known, or commercially available relational or No Structured Query Language (NoSQL) software/packages (e.g., Microsoft SQL, Oracle Database, Cassandra, MongoDB, etc.). Database 350 may include logic that provides an interface to a user to store, update, delete, perform a search or a lookup, etc., pertaining to the data stored in database 350. The access and privileges afforded to a subscriber relating to database 350 may be different than the privileges afforded to a network administrator.

Billing database 355 may store data pertaining to billing. For example, billing database 355 may store charging report data that indicates data usage (e.g., the number of bytes used and/or the number of packets used) of end device 150 and/or end user 153 (end device 150/end user 153). The charging report data may also include time information (e.g., date and timestamps) pertaining to the amount of data used (e.g., bytes, packets, etc.), credit of packets/bytes afforded (e.g., based on multiplier and/or context, such as time, location, etc.), location information, content information (e.g., type of application, type of content, etc.), data rate, and other metrics that pertain to the location-based service, the time-based service, etc. The charging report data may also include a balance or a remainder of data that can be used given the traffic control service associated with end device 150/end user 153. Unlike existing billing feeds that can be subject to hours of delay (e.g., due to a large number of data duplications), billing database 355 may store and update charging report data on a per/minute or a per/second time increment.

Rule database 360 may store data pertaining to the rules and/or the policies (rules/policies) that govern the traffic control service provided to subscribers. For example, rule database 360 may store rules and/or parameters data indicating how end device 150/end user 153 data flows are managed and billed, as described herein. For example, the rules and/or parameter data may include parameters and values indicating the allowance, the multiplier, the data metric, time, location, content, application type, etc., which govern the traffic control service pertaining to the time-based service, the location-based service, quota enforcement, packet drop, etc. The rules and/or parameters data may include a rule identifier that identifies the rules and/or policies. Rule database 360 may store end device identifiers and/or end user identifiers that correlate to the rules and/or parameters data. For example, a record may include one or multiple identifiers stored in identifier database 375, the rule identifier, and the rules and/or parameters data.

Analytics database 370 stores data pertaining to data flows that traverse programmable infrastructure 132. For example, analytics database 370 may store parameters and values that indicate characteristics of the data flow and/or data usage associated with end device 150/end user 153, such as the allowances, the multipliers, the data metrics, times, locations, contents, application types, types of traffic control services (e.g., time-based service, location-based service, etc.). Analytics database 370 may also store data that indicates dropped packet data, discount data, overage data, and/or other traffic control parameters and values pertaining to the data flows, the data usage, or other metric.

Identifier database 375 may store data pertaining to end device 150/end user 153, and the rules and/or parameters of the traffic control service. For example, identifier database 375 may store a mapping between one or multiple identifiers pertaining to end device 150/end user 153, and the rules and/or parameters data. By way of further example, the end device/end user identifiers may include a Mobile Directory Number (MDN), a Mobile Station International Subscriber Directory Number (MSISDN), an International Mobile Subscriber Identity (IMSI), an International Mobile Station Equipment Identity (IMEI), a Mobile Equipment Identifier (MEID), an IP address, a Media Access Control (MAC) address, or other address).

Referring back to FIG. 1, infrastructure layer 115 operates based on rules/policies and real-time analytics to provide the traffic control service. Infrastructure layer 115 enforces the rules/policies on subscriber data traffic on a per packet basis in the data path. According to an exemplary implementation, an interface between control layer 110 and infrastructure layer 115 includes the ForCES interface. For example, the ForCES protocol may be used to control communication between a control plane and a data plane. In the data path, infrastructure layer 115 includes multiple logical functional blocks (LFBs) in which each LFB performs a particular function. The rules/policies may be configured at application layer 105 and configured in infrastructure layer, 115 via control layer 110, such that the traffic control service is applied to subscriber data traffic occurring in the data path.

Figure 4B:
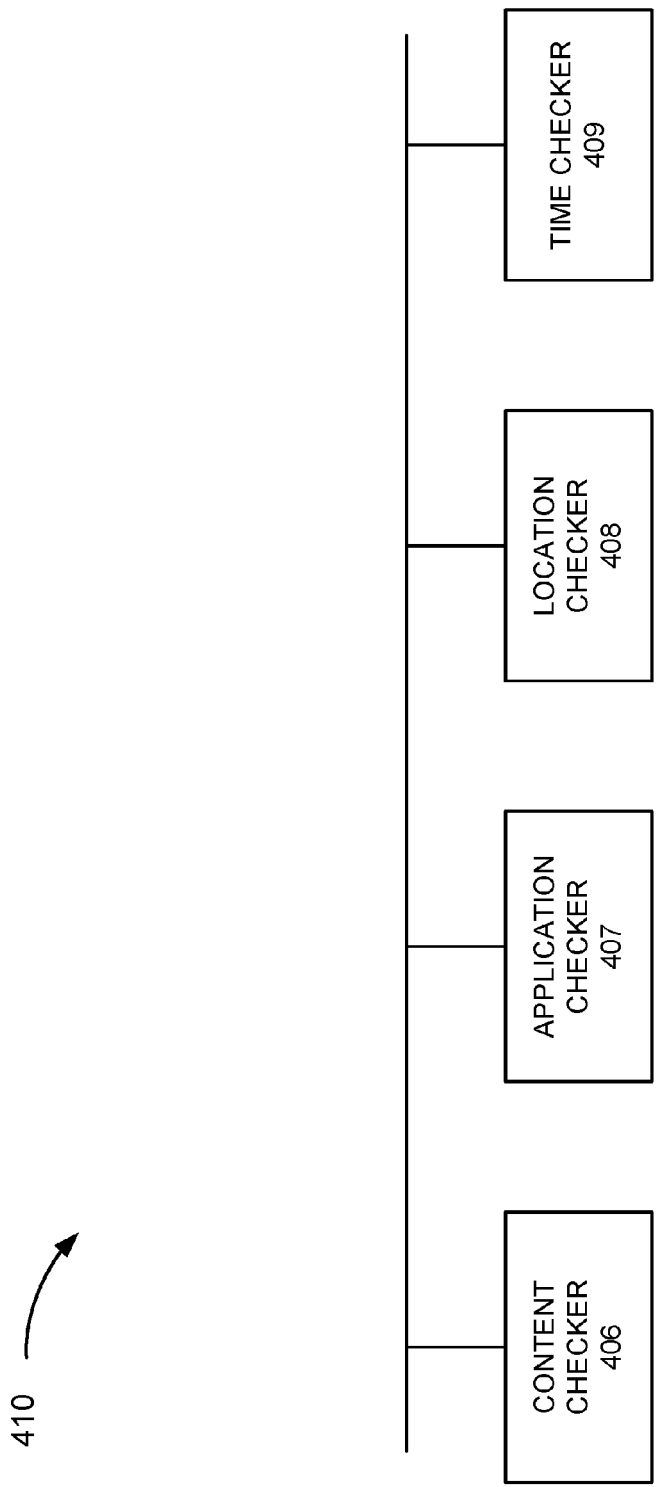
Figure 4C:
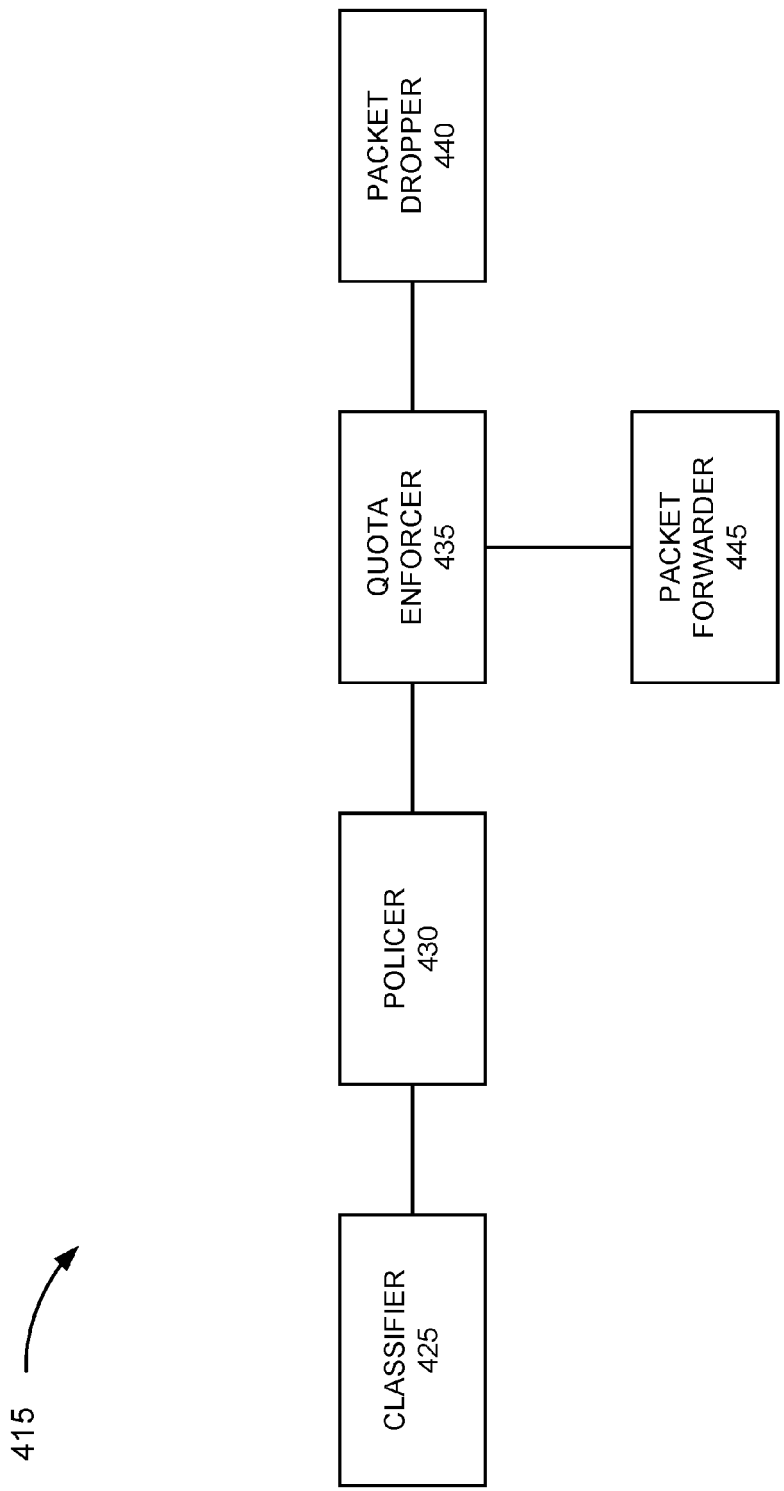

FIGS. 4A-4C are diagrams illustrating exemplary components of an exemplary embodiment of programmable infrastructure 132 of infrastructure layer 115 included in the traffic control platform. Referring to FIG. 4A, programmable infrastructure 132 may include a packet classifier 405, an application detector 410, a service classifier 415, and a policy application 430. As illustrated, application detector 410 and policy application 417 may operate in application space 420, and packet classifier 405 and service classifier 415 may operate in Kernel space 423. According to exemplary implementation, packet classifier 405, application detector 410, service classifier 415, and/or policy application 417 may be implemented as logic of a line card included with a network device. According to other exemplary implementations, programmable infrastructure 132 may include additional, fewer, and/or different components than those illustrated in FIGS. 4A-4C, and described herein. Additionally, multiple components may be combined into a single component. Additionally, or alternatively, a single component may be implemented as multiple components in which a process or a function may be collaboratively performed or multiple processes or functions may be split between them. According to various implementations, one or more of the components may operate on various planes of environment 100. For example, the various planes may include a data plane, a control plane, a management plane, and/or other planes implemented within environment 100. Each of the components described includes logic that supports the traffic control service, as described herein. The communication links illustrated are exemplary.

The traffic control service provided in infrastructure layer 115 allows for managing and manipulating the transmission of packets in the data path. For example, traffic control of the traffic control service provided in infrastructure layer 115 may permit the classifying, marking, shaping, scheduling, policing, and dropping of packets associated with end device 150/end user 150 data flows. Further, the traffic control service provides traffic control according to the content-based service, the location-based service, the time-based service, and the QoS-based service, as described herein.

Packet classifier 405 may include logic that classifies packets based on a mapping between an identifier (e.g., an end user identifier, an end device identifier, etc.) and the rule identifier. According to an exemplary implementation, packet classifier 405 may include logic of a deep packet inspector (DPI). According to another exemplary implementation, packet classifier 405 may include logic of a packet filter. In either implementation, packet classifier 405 may obtain network protocol data (e.g., source address, destination address, port number, etc.). The source address, for example, may be treated as the end user identifier or the end device identifier.

According to exemplary implementations, packet classifier 405 may obtain another identifier that has been mapped to the rules/policies ascribed to end device 150/end user 153 and the packet. The other identifier may be added to the packet or separately transmitted to packet classifier 405, as described herein. For example, according to various exemplary implementations, access network 135 (described further below) may be implemented to include a Long Term Evolution (LTE) or LTE-Advanced (LTE-A) infrastructure. A PGW (not illustrated) may assign an IP address to end device 150 during an attachment procedure. According to an exemplary implementation, in response to the IP address assignment or other triggering event (e.g., establishment of the default bearer with end device 150, receipt of subscriber data traffic from end device 150, etc.), the PGW may transmit a message to packet classifier 405, which includes the IP address and the other identifier. For example, the other identifier may be the MDN or other end user/end device identifier described in relation to identifier database 375. Packet classifier 405 may receive the message, via the control plane, and pass the message to policy application 417. As described herein, policy application 417 may communicate the identifiers to policy manager 320 of control layer 110. As a result, policy manager 320 may use the identifiers to configure a database used by packet classifier 405 or application detector 410. When a packet of end device 150/end user 153 data flow is received from end device 150, the PGW may route the packet to a particular programmable infrastructure 132 (from among multiple programmable infrastructures 132) based on the assigned IP address and/or other identifier (e.g., the MDN, etc.) associated with end device 150/end user 153. In this way, packet classifier 405 may receive the packet that pertains to the mapping stored in the database of packet classifier 405.

According to another exemplary implementation, the PGW may add data indicating the other identifier to one or more packets of a subscriber data flow. For example, the PGW may add the data to the beginning packet(s) of the subscriber data flow based on the sequence number associated with the packet(s). During packet inspection, packet classifier 405 may extract the IP address and the other identifier from the packet, and pass a message that includes the IP address and the other identifier to policy application 417. In a manner similar to that previously described, policy application 417 may communicate the identifiers to policy manager 320, and in turn, the database used by packet classifier 405 may be configured. According to other exemplary implementations, a network device other than a PGW, may perform the functions described. For example, when access network 135 includes a network other than an LTE or an LTE-A, another type of network device (e.g., an anchor node, a serving GPRS support node (SGSN), a gateway GPRS support node (GGSN), etc.), an intermediary network device residing between access network 135 and programmable infrastructure 132, or residing in programmable infrastructure 132, may perform these functions, as described herein.

Packet classifier 405 may include logic that, based on the data obtained from packet inspection, uses the obtained data as a key to a mapping stored in a data structure or a database. For example, the database may store a mapping between an identifier of end device 150/end user 153 and the traffic control service assigned to the packet. By way of further example, a record stored in the database may include the IP address assigned to end device 150 during an attachment procedure with access network 135 (e.g., source address), and the rule identifier that identifies the rules/policies of the traffic control service to be applied in the data path. According to an exemplary implementation, the database may be stored locally.

According to various embodiments, end device 150/end user 153 may subscribe to one or multiple services that may impact billing. For example, end device 150/end user 153 may subscribe to a subscription service in which data usage is billed the same regardless of time of connection, location of end device 150/end user 153, application used, etc. Alternatively, end device 150/end user 153 may subscribe to a subscription service in which data usage is not billed the same depending on various factors. For example, end device 150/end user 153 may subscribe to a "special" data plan or "special" traffic control service that affords certain benefits relative to a "normal" data plan or "normal" traffic control service. The traffic control service may identify end device 150/end user 153 as having or not having the "special" traffic control service based on the identifier included in the packet and the database. According to an exemplary implementation, packet classifier 405 includes logic that performs a lookup or a query to the database based on the identifier. For example, the database may store a mapping between the IP address of end device 150/end user 153 and the rule identifier. Based on a result of the lookup or query, packet classifier 405 may classify the packet, end device 150, and/or end user 153 as having the special data plan or not. According to exemplary embodiments, the special data plan includes the content-based service, the location-based service, the time-based service, and the QoS-based service, as described herein.

According to an exemplary implementation, packet classifier 405 may include logic that, when packet classifier 405 determines that the IP address or other identifier associated with the packet matches an entry in the database, adds data to the packet. For purposes of description, the data may be referred to as a marker. By way of example, the marker may include the rule identifier, which identifies the normal traffic control service or some other nomenclature that indicates a non-special data plan. According to various exemplary implementations, the marker may be added in a field of the packet, such as in the header, the trailer, or the payload. Packet classifier 405 may pass the marked packet to service classifier 415. Although not illustrated, the marked packet may be processed by intermediary components, such as a stack (e.g., Transmission Control Protocol/IP stack, etc.).

According to an exemplary implementation, when packet classifier 405 determines that the IP address or other identifier associated with the packet does not match an entry in the database, packet classifier 405 includes logic to pass the packet, without marking the packet, to application detector 410. Packet classifier 405 may include logic that performs other packet filtering operations, such as determining whether end device 150/end user 153 is blacklisted, etc.

Application detector 410 may include logic that classifies packets based on a mapping between an identifier (e.g., an end user identifier, an end device identifier, etc) and the rule identifier. For example, application detector 410 may include packet inspection logic (e.g., a DPI, a packet filter, etc.) that obtains network protocol data. Application detector 410 may include logic that, based on the data obtained from packet inspection, uses the obtained data as a key to a mapping stored in a data structure or a database. For example, the database may store a mapping between an identifier of end device 150/end user 153 and the traffic control service ascribed to the packet. By way of further example, a record stored in the database may include the IP address assigned to end device 150 (e.g., source address), and the rule identifier that identifies the rules/policies of the traffic control service to be applied in the data path. The database of application detector 410 may store mappings that indicate one or multiple special traffic control services. According to exemplary implementations, the special traffic control services include the content-based service, the location-based service, the time-based service, and the QoS-based service, as described herein, in which quota enforcement, data rate, packet drop, etc., of a traffic control is to be applied. In this regard, application detector 410 may determine or identify the special data plan, from among multiple special data plans, which pertain to the packet. According to an exemplary implementation, the database may be stored locally.

FIG. 4B is a diagram illustrating exemplary components of an exemplary embodiment of application detector 410. For example, application detector 410 may include a content checker 406, an application checker 407, a location checker 408, and a time checker 409. According to other exemplary embodiments, content checker 406, application checker 407, location checker 408, and time checker 409 may reside in application space 420 as stand-alone components that are not included in application detector 410. According to other exemplary implementations, application detector 410 may include additional, fewer, and/or different components than those illustrated in FIG. 4B, and described herein. Additionally, multiple components may be combined into a single component. Additionally, or alternatively, a single component may be implemented as multiple components in which a process or a function may be collaboratively performed or multiple processes or functions may be split between them. Each of the components described includes logic that supports the traffic control service, as described herein. The communication links illustrated are exemplary.

Content checker 406 includes logic that supports the content-based service, as described herein. According to an exemplary implementation, content checker 406 includes logic of a DPI that is able to identify a particular content or a type of content. For example, content checker 406 may inspect the payload data, or the payload data along with other data included in the packet (e.g., header data, trailer data, etc.), and determine a type of content (e.g., advertising content, a web page, a video, e-mail, music, movie, etc.), and/or content (e.g., a television series (e.g., The Affair, Westworld, etc.), music of a particular group (e.g., Led Zepplin, Usher, etc.), a particular web site (e.g., Microsoft News (MSN), Netflix, Facebook, Youtube, etc.).

Application checker 407 includes logic that supports the application-based service, as described herein. According to an exemplary implementation, application checker 407 includes logic of a DPI that is able to identify an application or a type of application. For example, application checker 407 may inspect the payload data, or the payload data along with other data included in the packet (e.g., header data, trailer data, etc.), and determine a type of application (e.g., a streaming application, an e-mail application, an instant messaging, a texting application, a real-time application, a web browsing application, etc.), or a particular application (e.g., Microsoft Media Player, Microsoft Outlook, Skype, Internet Explorer, etc.).

Location checker 408 includes logic that supports the location-based service, as described herein. For example, in a manner similar to that described in which the PGW or other network device transmits a message, which includes the other identifier, to packet classifier 405, the PGW or other network device transmits a message, which includes location information of end device 150/end user 153, to packet classifier 405 or application detector 410. For example, the location information may indicate Global Positioning System (GPS) coordinates (e.g., latitude, longitude) or other geographic coordinates. According to an exemplary implementation, location checker 408 may include logic that correlates the geographic coordinate to a particular location (e.g., end user's home, place of work, Fenway park, a city (e.g., Boston, New York City), a state (e.g., Massachusetts, New York, Virginia, etc.) or a type or a category of location (e.g., restaurants, bars, parks, museums, airports, etc.), as described herein.

Time checker 409 includes logic that supports the time-based service, as described herein. For example, time checker 409 includes logic that determines a current time or time window. For example, based on the system time of the network device, time checker 409 may determine the current date, day (e.g., Monday, etc.), hour, minute second, or other configurable time (e.g., daytime, nighttime, weekend, etc.) ascribed to the packet, end device 150, and/or end user 153.

According to an exemplary implementation, application detector 410 includes logic that performs a lookup or a query of the database based on the identifier. For example, the database may store a mapping between the IP address of end device 150/end user 153 and the rule identifier. Based on a result of the lookup or query, application detector 410 may identify or determine the type of special traffic control service (e.g., the content-based service, the application-based service, etc.) ascribed to the packet. It should be noted that end device 150/end user 153 may be subscribed to one or multiple of the special traffic control services, as described herein.

According to an exemplary embodiment, application detector 410 includes logic that determines whether the context of the packet, end device 150, and/or end user 153 satisfies the configuration of the special traffic control service. For example, depending on the type of special data plan ascribed to the packet, application detector 410 may obtain from content checker 406, application checker 407, location checker 408, and/or time checker 409, one or more instances of checked information (e.g., type of content, type of application, time, location, etc.). For example, application checker 407 may obtain location information, which indicates the current location of end device 150/end user 153, from location checker 408. Application detector 407 includes logic that compares the checked information to the rules and/or parameter data of the location-based service, which is customized for end device 150/end user 153. For example, assume that end user 153 subscribes to the location-based service, and has configured the traffic control service such that when at home, the multiplier has a value of 0.5 under an allowance of 4 GB. Application detector 407 includes logic that compares the current location to this configured location, and determines whether the current location matches the configured location. In similar fashion, application detector 407 includes logic that compares current checked information with the customized configurations of the content-based service, the application-based service, the time-based service, and the QoS-based service, to determine whether a criterion has been satisfied.

According to another exemplary embodiment, application detector 407 does not make such comparisons. Rather, application detector 407 includes logic that obtains the current checked information, and passes the checked information to service classifier 415. Additionally, depending on the special traffic control service, the checked information may or may not need to be performed continuously in relation to a data flow. For example, the location-based service and the time-based service may necessarily require a continuous monitoring because of the passage of time and the potential for end device 150/end user 153 to change location. On the other hand, for example, the type of content or the type of application may remain a constant during a data flow (or session).

Application detector 410 includes logic that adds data to the packet based on determining the special traffic control service (e.g., the content-based service, the application-based service, etc.). For example, application detector 410 may add a marker to the packet. The marker may include the rule identifier, which indicates the special traffic control service. Depending on the type of special traffic control service, the marker may include data that indicates, in addition to the type of special traffic control service, other data pertaining to the special traffic control service.

According to an exemplary embodiment, application detector 407 includes logic that the marker indicates, in addition to the type of special traffic control service, the checked information. According to another exemplary embodiment, application detector 407 includes logic that the marker indicates, in addition to the type of special traffic control service, traffic control parameters and values in accordance with the checked information and the special traffic control service. For example, the marker may include data that indicates a parameter (e.g., the multiplier directed to data usage) and the parameter value (e.g., 0.5 or 50%), or the parameter value. According to other examples, other types of parameters and parameter values, or parameter values, may be included in the marker, such as the data rate, the allowance, a quality-of-service (QoS) indicator, or other variable that may applicable to the special traffic control service (e.g., overage, dropped packet, etc). For example, for some applications accessed or used by end device 150/end user 153, the multiplier may be applied to data usage. By way of further example, when end user 153 accesses a social networking site (e.g., Facebook), only 50% of the data usage is counted towards a maximum quota of data usage. Alternatively, when end device 150 accesses a particular site (e.g., a database, a server, etc.) as a part of an M2M communication, only 10% of the data usage is counted towards a maximum quota of data usage. During the packet inspection process, application detector 410 may obtain the destination address and/or application data included in the packet. During the query process of the database, for example, application detector 410 may use this data to determine the type of end device/end user access (e.g., whether end user 153 is accessing a social networking site or not, whether end device 150 is transmitting to or receiving from a particular network address).

Subsequent to the adding of the marker, application detector 410 may transmit or pass the marked packet to service classifier 415. Although not illustrated, the marked packet may be processed by intermediary components, such as a stack (e.g., TCP/IP stack, etc.). Application detector 410 may include logic that generates analytics records, and transmits the analytics records, via a control plane, to analytics manager 325 of control layer 110.

Service classifier 415 may include logic that determines the traffic control service applied to the packet based on the marker. Also, service classifier 415 may include logic that applies the determined service to the packet. Referring to FIG. 4C, service classifier 415 may be implemented to include a classifier 425, a policer 430, a quota enforcer 435, a packet dropper 440, and a packet forwarder 445.

Classifier 425 may include logic that classifies the service applied to the packet based on the marker included in the packet. According to an exemplary implementation, the marker includes data that indicates the type of service to be provided to the packet. Based on the marker obtained, classifier 425 may include logic that uses the marker as a key to a mapping stored in a data structure or a database. For example, the database may store a mapping between the rule identifier and the service ascribed to the packet, end device 150, and/or end user 153. According to an exemplary implementation, the database may be stored locally. The service may be implemented by various traffic control (TC) functions. According to an exemplary implementation, the service may be implemented to include policer 430, quota enforcer 435, and packet dropper 440. According to other exemplary implementations, the service may be implemented as having additional and/or different TC functions.

Policer 430 includes logic that controls the data traffic speed of a packet. Quota enforcer 435 includes logic that performs real-time quota enforcement. For example, quota enforcer 435 includes logic that may provide functions otherwise provided by the Gy and Rf feed outside of the data path, but provides these functions directly in the data path. Quota enforcer 435 may include logic that applies the customized parameters and parameter values of a special data plan so that customized inline quota enforcement is provided. When data usage is exceeded, quota enforcer 435 may include logic that passes the packet to packet dropper 440 or accounts for and charges end device 150/end user 153 for overage usage when the current data usage exceeds a quota limit. When the data usage is not exceeded, quota enforcer 435 may include logic that passes the packet to packet forwarder 445.

According to an exemplary embodiment, quota enforcer 435 uses programmable parameters to provide the special traffic control service. According to an exemplary implementation, the programmable parameters include an allowance parameter and a multiplier parameter. The allowance parameter indicates the amount of data end device 150/end user 153 has ordered or is afforded under the special traffic control service. As packets flow through quota enforcer 435, quota enforcer 435 may deduct the data usage from the allowance. The multiplier parameter indicates how the data usage from the flow of packets should be deducted. For example, when the multiplier parameter has a value of 0.5, and the flow of packets amounts to 400 Megabytes (MB) of data, quota enforcer 435 may deduct only 200 MB as data usage.

Conventional billing systems use the Gy interface to manage the quota and credits between the OCS and the PCEF, which lie outside of the data path of end device 150/end user 153 traffic, and can result in an inordinate amount of messages exchanged between the PCEF and the OCS. This is especially true when the data limit is about to be met. Unfortunately, since the decision of quota and credits are made outside of the data path (i.e., not inline), billing end users can result in unnecessary overhead in the network and delay pertaining to billing. In contrast, quota enforcer 435 may manage the quota and credits in the data path of end device 150/end user 153 traffic, which allow for flexible and real-time quota enforcement.

Quota enforcer 435 may include logic that generates a traffic control report and provides the traffic control report, via a control plane, to billing manager 330 of control layer 110. The traffic control report may include a charging data report and/or a traffic control report (e.g., data usage, number of dropped packets, date and timestamp data, destination data indicating destination address of packets, etc.). Unlike conventional billing systems that use an offline Rf feed to report the data usage every several hours, quota enforcer 435 can generate a canonical record in real-time with enriched information that can be consumed by multiple parties to achieve various billing goals. Also, instead of charging data records or other billing data being stored across multiple network devices in different formats, quota enforcer 435 facilitates storage of charging data records in a reliable cloud-centric storage space to avoid unnecessary data redundancy and wasted storage space. Further, quota enforcer 435 may report the charging data record in near real-time and more frequently, compared to conventional billing systems.

Packet dropper 440 includes logic that drops a packet when a certain condition exists. For example, when end device 150/end user 153 exceeds data usage allowance afforded under the special traffic control service, packet dropper 440 may drop the packet. Packet forwarder 445 includes logic that routes and transmits the packet toward its destination.

Referring back to FIG. 1, access network 135 may include one or multiple networks of one or multiple types. For example, access network 135 may include a wired network and/or a wireless network. By way of further example, access network 135 may include a radio access network (RAN), a core network, a local area network (LAN), or other type of network.

Network 140 may include one or multiple networks of one or multiple types. For example, network 140 may be implemented to provide an application or a service to end device 150. By way of further example, network 140 may include a private network, a public network (e.g., the Internet, the World Wide Web (WWW), etc.), an IP Multimedia Subsystem (IMS) network, a Rich Communication Service (RCS) network, a cloud network, or other type of network that may be external to the access network 135 to which end device 150 is communicatively coupled.

End device 150 includes a device that has communication capabilities. End device 150 may be implemented as a mobile device, a portable device, or a stationary device. For example, end device 150 may be implemented as an end user device. For example, the end user device may be implemented as a smartphone, a personal digital assistant, a tablet, a laptop, a netbook, a phablet, a wearable device, or some other type user device. According to other exemplary implementations, end device 150 may be implemented as a machine-type communication (MTC) device, an Internet of Things (IoT) device, or a machine-to-machine (M2M) device. As previously described, end user 153 is a person that operates end device 150. For example, end user 153 may be a subscriber, a customer, or other person subject to the traffic control services, as described herein. According to other exemplary implementations, such as when end device 150 is implemented as an M2M device, end user 153 may be omitted in environment 100.

FIG. 5 is a diagram illustrating exemplary components of a device 500 that may correspond to one or more of the devices described herein. For example, device 500 may correspond to components of user interface 120, components of cloud controller 124, components of programmable infrastructure 132, and/or end device 150. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein. Additionally, or alternatively, according to other embodiments, multiple components may be combined into a single component. For example, processor 510, memory/storage 515, and communication interface 525 may be combined.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 515 may include a hard disk (e.g., a magnetic disk, an optical disk, a magneto-optic disk, a solid state disk, etc.) and a corresponding drive. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to application layer 105, control layer 110, and infrastructure layer 115, software 520 may include an application that, when executed by processor 510, provides the functions of the traffic control service, as described herein. Also, end device 150 may include an application that, when executed by processor 510, provides the functions of the application layer 105, as described herein. Software 520 may also include firmware, middleware, microcode, hardware description language (HDL), and/or other form of instruction. Software 520 may include an operating system that, when executed, by processor 510, provides the functions of the traffic control service, as described herein. For example, with respect to infrastructure layer 115, according to an exemplary implementation, the traffic control service is provided in application space 420 and Kernel space 423. By way of further example, application space 420 and Kernel space 423 may be implemented in a line card of a network device. Application space 420 and Kernel space 423 may each include one or more components of device 500 (e.g., processor 510, memory/storage 515, software 520, etc.), or application space 420 and Kernel space 423 may share one or more components of device 500 (e.g., processor 510, memory/storage 515, software 520, etc.).

Communication interface 525 permits device 500 to communicate with other devices, networks, systems, and/or the like. Communication interface 525 includes one or multiple wireless interfaces. Communication interface 525 may include one or multiple wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include one or multiple line cards that provide the traffic control service, as described herein. For example, communication interface 525 may include processor 510, memory/storage 515, and software 520.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
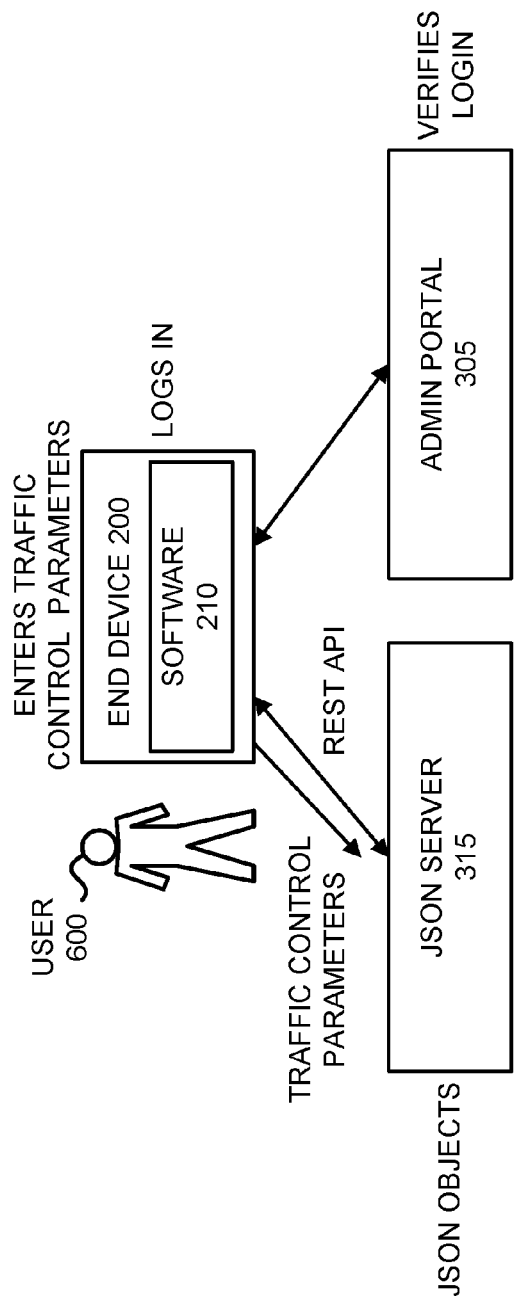
FIG. 6 is a diagram illustrating an exemplary process of the traffic control service at the application layer.

FIG. 6 is a diagram illustrating an exemplary process of the traffic control service at application layer 105. Assume a user 600 (e.g., a network administrator) wishes to configure a traffic control service on behalf of an end user. According to other examples, user 600 may be the end user (e.g., a customer or a subscriber) of the traffic control service via a service provider (e.g., a wireless service provider, etc.). User 600 logs on to administrative portal 305 by entering credentials (e.g., user name and password) after connecting end device 200 to administrative portal 305 via a web browser. Administrative portal 305 determines whether the credentials are valid. According to this exemplary scenario, administrative portal 305 successfully authenticates and authorizes user 600. Thereafter, user 600 is navigated to JSON server 315, which provides user interfaces having REST APIs that perform REST services allowing user 600 to configure the subscriber's traffic control service. For example, user 600 may enter, via the user interface, one or multiple identifiers of the user/end device to which the traffic control service pertains. For example, user 600 may enter, via the user interface, the MDN associated with the subscriber or other static and/or unique identifier that identifies end device 150/end user 153, such as an identifier previously described in relation to identifier 375.

User 600 may also enter or select other rules and/or parameters that configure the special traffic control service. According to exemplary embodiments, user 600 can provision one or multiple special traffic control services including the content-based service plan, the location-based service plan, the time-based service plan, and the QoS-based service plan, as described herein. For example, assume that the special traffic control service provides an option to have a data usage limit of 4 GB/month, that data usage is free for a particular web site, and that evening usage (e.g., between 6 p.m.-midnight) is 50% discounted. User 600 may configure the special traffic control service via the user interfaces according to these traffic control parameters. For example, user 600 may enter or select the type of special traffic control service, may enter or select the allowance (e.g., 4 GB/month), may enter or select a URL of the particular web site (e.g., www.facebook.com) or a name of an application (e.g., Facebook), and may enter or select the multiplier value of 0.5 via the user interface. These configurations may be converted to JSON objects. JSON server 315 includes logic that may process the JSON objects, as described herein. In this way, a special traffic control service may be provisioned in real-time and on-demand by user 600.

Although FIG. 6 illustrates an exemplary process of the traffic control service at application layer 105, according to other embodiments, the process may include additional operations, fewer operations, and/or different operations than those illustrated in FIG. 6 and described herein. For example, the customized traffic control parameters may be different depending on the type of special traffic control service being configured or provisioned by user 600. By way of further example, the customized traffic control parameters may indicate a time period, a location, and/or other parameters and values, as described herein. Additionally, or alternatively, software 210 may not be a web browser. For example, software 210 may be implemented as a mobile application that end user 153 can use to communicate with JSON server 315, and customize and configure the special traffic control parameters. Additionally, or alternatively, user 600 may perform other actions (e.g., viewing a billing record, communicate with and/or configure other network devices at control layer 110 (e.g., analytics manager 325, database 350, etc.)) and/or at infrastructure layer 115 (e.g., classifier 425, quota enforcer 435, etc.).

Figure 7A:
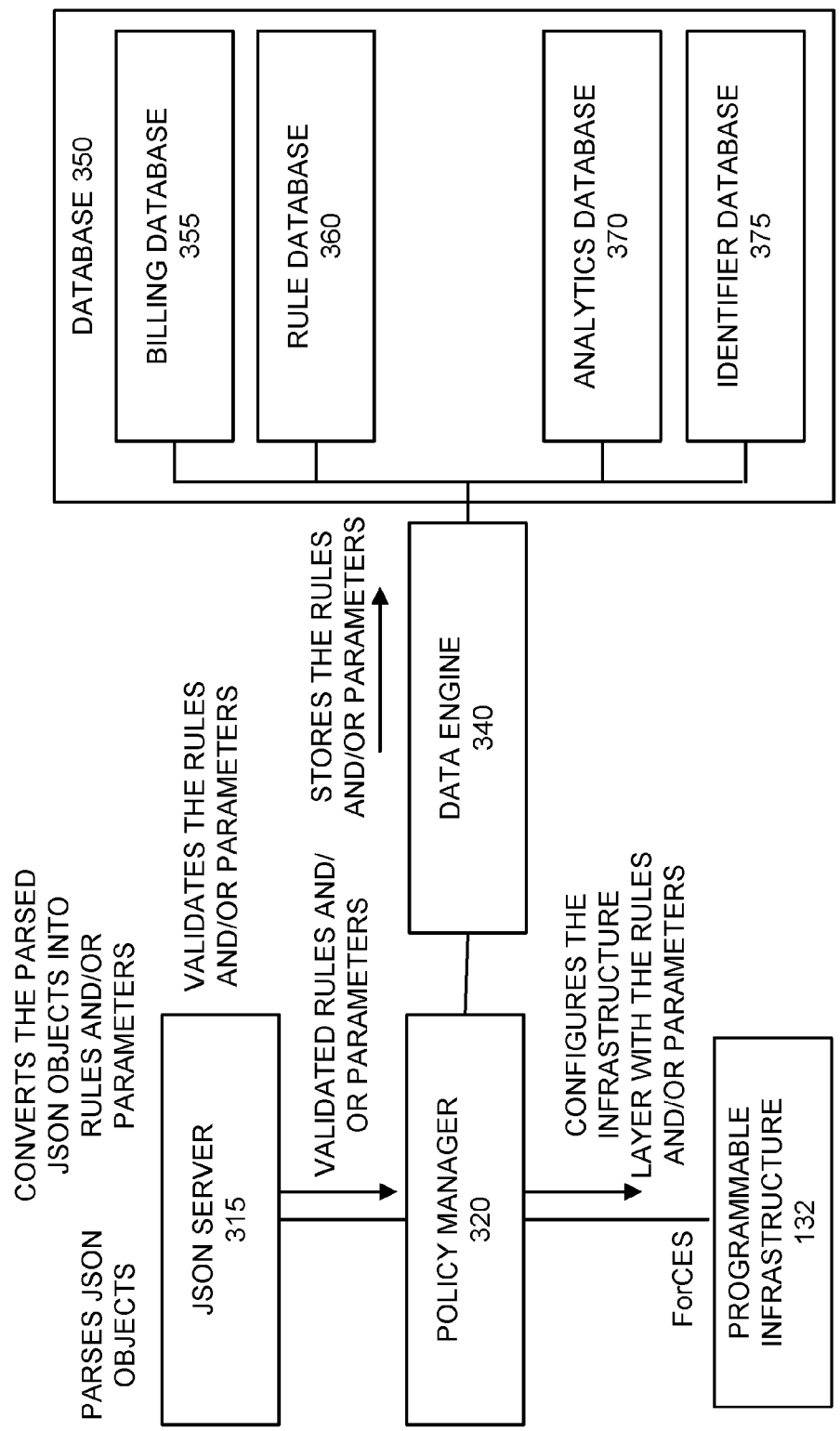
FIGS. 7A-7C are diagrams illustrating exemplary processes of the traffic control service at the control layer.
Figure 7B:
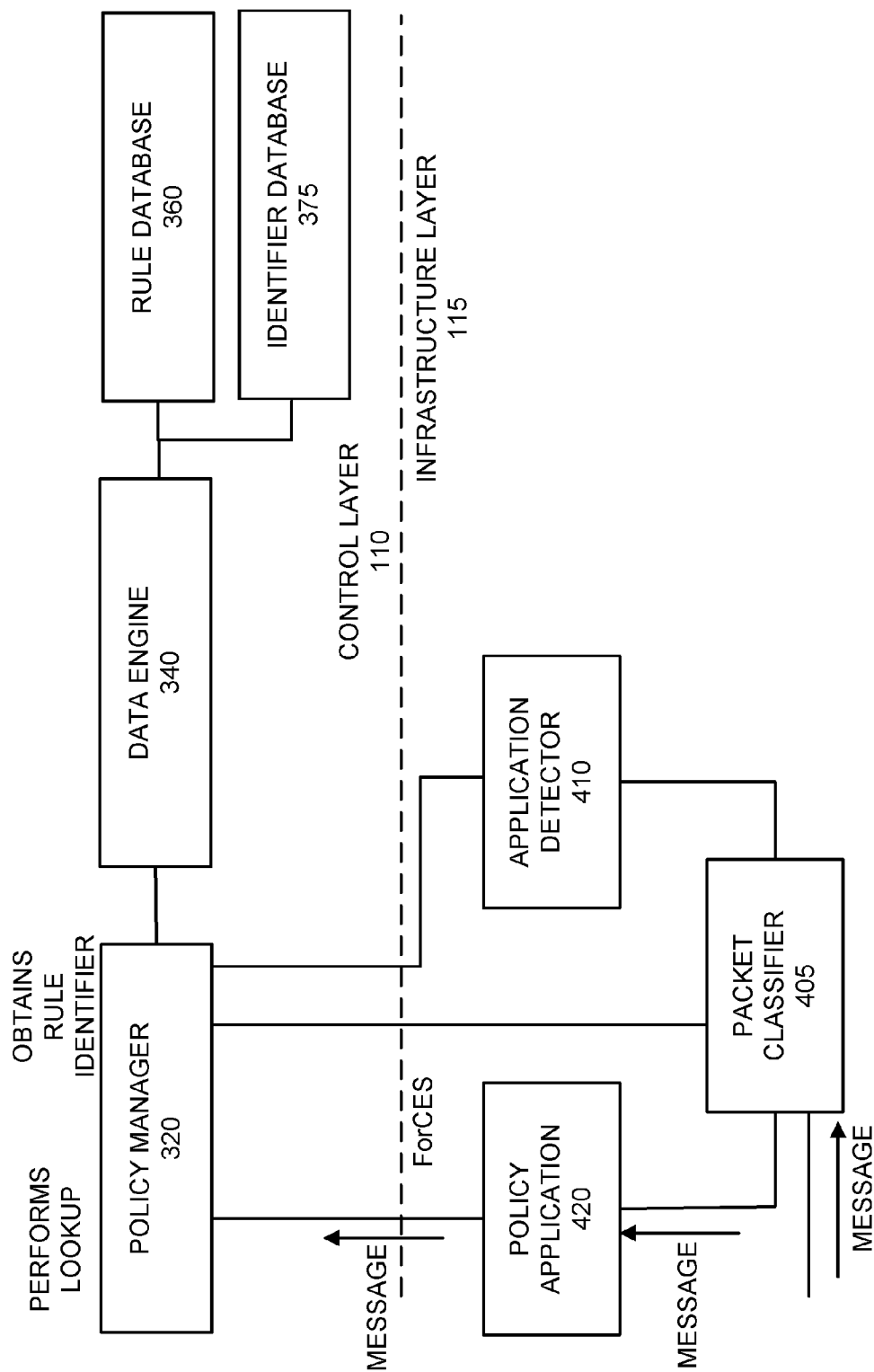
Figure 7C:
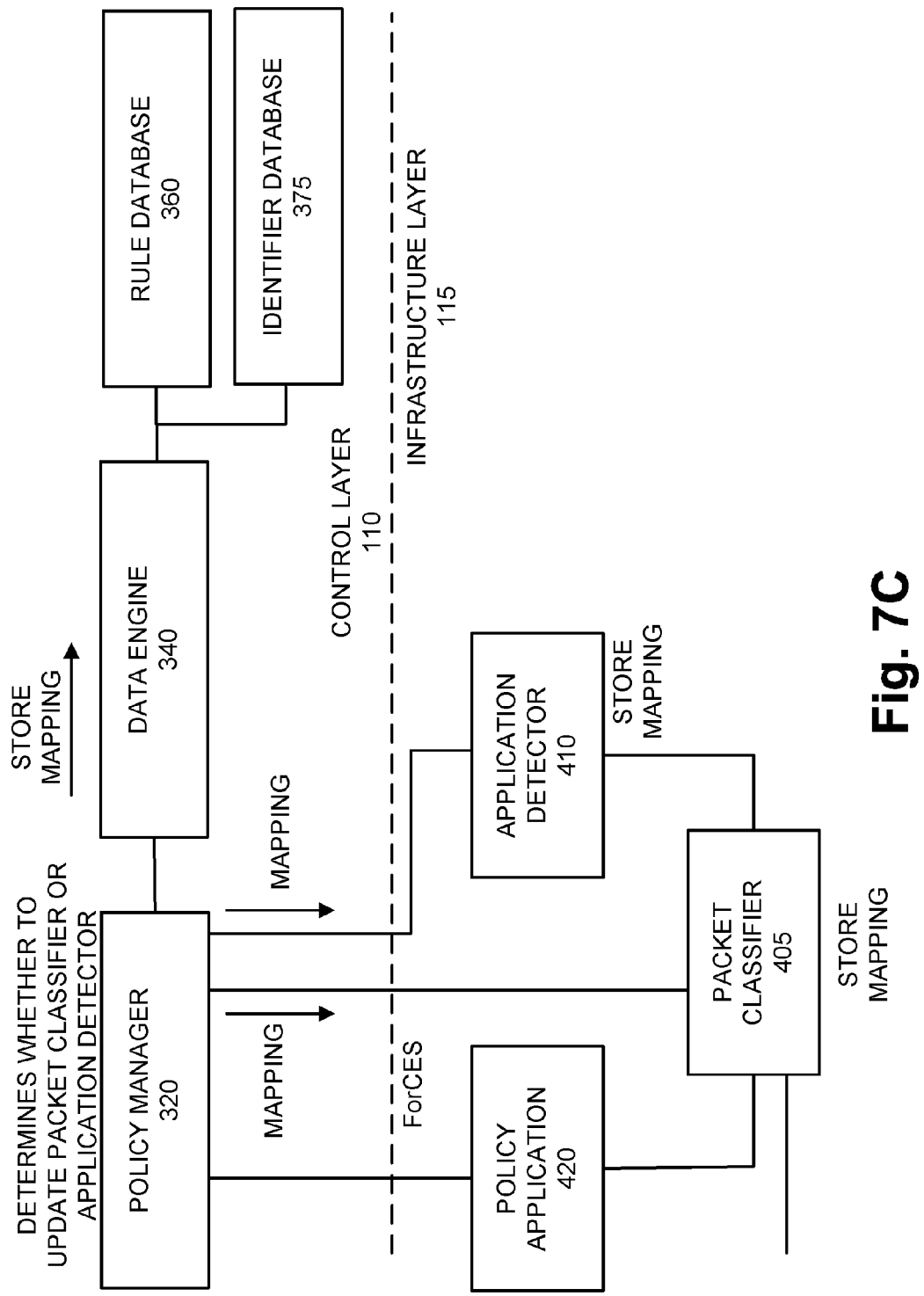

FIGS. 7A-7C are diagrams illustrating an exemplary process of the traffic control service at control layer 110. Assume that JSON server 315 obtains JSON objects, which pertain to the traffic control service of end device 150/end user 153, from application layer 105 via the REST API. For example, as previously described, assume that the JSON objects indicate the data usage limit of 4 GB/month, that data usage is free for a particular web site, and that evening usage (e.g., between 6 p.m.-midnight) is 50% discounted. JSON server 315 parses the JSON objects, and converts the parsed JSON objects into rules and/or parameters that can be carried out as Linux Kernel operations. JSON server 315 validates the rules and/or parameters. In response to successfully validating the rules and/or parameters, JSON server 315 passes or transmits the validated rules and/or parameters data to policy manager 320. Also, in response to validating the rules and/or parameters, JSON server 315 may store the rules and/or parameters data, along with the end user/end device identifier, in database 350 (e.g., rule database 360) via data engine 340.

Policy manager 320 obtains the validated rules and/or parameter data from JSON server 315, and configures infrastructure layer 115 with the validated rules and/or parameters data via the ForCES interface. According to an exemplary implementation, policy manager 320 may generate and/or assign the rule identifier that identifies the rules and/or parameter data. According to another exemplary implementation, JSON server 315 may generate and/or assign the rule identifier, and pass or transmit the rule identifier to policy manager 320. According to an exemplary implementation, in response to receiving the validated rules and/or parameter data or other triggering event, policy manager 320 may configure service classifier 415 of programmable infrastructure 132. By way of further example, policy manager 320 may configure the database of classifier 425 to include a rule identifier-to-service mapping. Also, for example, policy manager 320 may configure policer 430 and/or quota enforcer 435 with parameters and parameter values so that the TC functions of the service are provided. According to an exemplary implementation, the parameters and the parameter values may include a location, a time period, a multiplier, an allowance, etc., that provide the configuration of the time-based service, the content-based service, and so forth, depending on the special traffic control service. According to another exemplary implementation, policy manager 320 may provide the parameters and the parameter values to application detector 410. According to such an implementation, application detector 410 may compare checked information with the configuration of the special traffic control service, as described herein.

Referring to FIG. 7B, assume end device 150/end user 153 attaches to access network 140 via end device 150. During the attachment procedure, end device 150 is assigned an IP address. According to this example, the PGW (not illustrated) transmits a message, which includes the IP address and another user/end device identifier, to packet classifier 405. According to other examples, the message may also include other information (e.g., a location of end device 150/end user 153). As illustrated, the message is passed or transmitted to policy manager 320 via policy application 417. In response to receiving the message, policy manager 320 performs a lookup in rule database 360 using the other user/end device identifier. For example, policy manager 320 uses an MDN or other unique end user/end device identifier to find a match with the MDN or other unique end user/end device identifier that is stored in rule database 360. When a match is found, policy manager 320 obtains the correlated rule identifier. Referring to FIG. 7C, based on the rule identifier or other data correlated to the rule data stored in rule database 360, policy manager 320 determines whether to update the database of packet classifier 405 or the database of application detector 410. For example, when the rule identifier identifies a normal traffic control service, policy manager 320 may update the database of packet classifier 405, and when the rule identifier identifies a special traffic control service, policy manager 320 may update the database of application detector 410. Based on the result of the determination, policy manager 320 may configure the database. For example, policy manager 320 may configure a record in the database that includes a mapping. The mapping may include one or multiple end user/end device identifiers and the rule identifier. By way of further example, the mapping may include the IP address (e.g., the source address of end device 150), an MDN or other unique and static identifier, and the rule identifier. According to an exemplary implementation, the mapping for application detector 410 may include the parameters and the parameter values of the special traffic control service. According to such an implementation, application detector 410 may compare checked information with the configuration of the special traffic control service, as described herein. According to another exemplary implementation, the mapping for application detector 410 may not include the parameters and the parameter values of the special traffic control service. Packet classifier 405 or application detector 410 may store the mapping in its database. Policy manager 320 may also store the mapping in identifier database 375.

Although FIGS. 7A-7C illustrate an exemplary process of the traffic control service at control layer 110, according to other embodiments, the process may include additional operations, fewer operations, and/or different operations than those illustrated in FIGS. 7A-7C, and described herein. For example, referring back to FIG. 7A, policy manager 320 may also configure the database of packet classifier 405 or application detector 410. As example, according to an exemplary implementation in which initial packet(s) of a subscriber data flow may include the unique and static identifier (e.g., added by the PGW or other network device), policy manager 320 may configure the database with the mapping. The mapping may include the unique and static identifier (e.g., an MDN, etc.) and the rule identifier. When a packet is subsequently received by packet classifier 405 or application detector 410, packet classifier 405 or application detector 410 may initially use the unique identifier included in the packet to classify the packet and, thereafter, use the IP address. Packet classifier 405 and application detector 410 may update policy manager 320 with the IP address related to the unique identifier and the rule identifier.

Figure 8A:
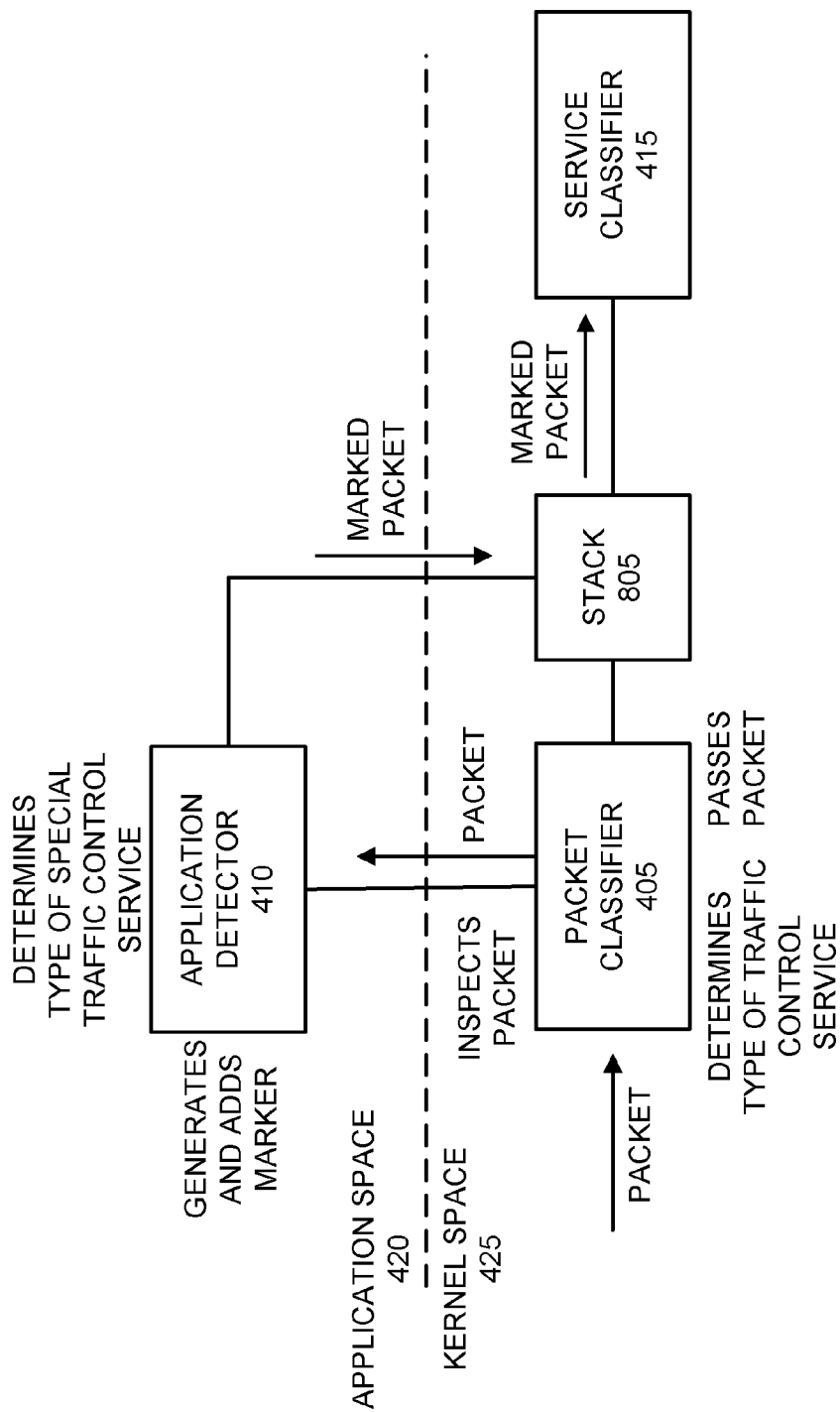
FIGS. 8A-8D are diagrams illustrating an exemplary process of the traffic control service at the infrastructure layer.

FIGS. 8A-8D are diagrams illustrating an exemplary process of the traffic control service at infrastructure layer 115. Assume that programmable infrastructure 132 has been configured by control layer 110. Referring to FIGS. 1 and 8A, further assume that end user 153 is a subscriber and transmits a packet via end device 150 and access network 135. The packet is received by a programmable infrastructure 132 that is configured to provide the traffic control service for end user 153. For example, the packet is received by packet classifier 405. Packet classifier 405 inspects the packet. Based on the inspection of the packet, packet classifier 405 obtains data (e.g., an identifier, etc.), as described herein. In response to obtaining the data, packet classifier 405 determines a type of traffic control service. For example, packet classifier 405 may perform a lookup in a database using the obtained data to determine if there is a match stored in the database. As an example, packet classifier 405 may determine whether the IP address of the packet is stored in the database. According to this example, assume that packet classifier 405 cannot find the IP address in the database, and classifies the packet as being correlated to a special or customized traffic control service. In response, packet classifier 405 passes the packet to application detector 410.

Application detector 410 obtains the packet and performs its own packet inspection. Based on the packet inspection, application detector 410 obtains data, and determines the type of special or customized traffic control service ascribed to the packet based on the obtained data. For example, application detector 410 may perform a lookup in a database using the obtained data, and identify the type of special traffic control service correlated to the obtained data. Based on the type of special traffic control service, application detector 410 may obtain checked information from content checker 406, application checker 407, location checker 408, and/or time checker 409. Application detector 410 generates a marker, and adds the marker to the packet, as described herein. The marker may include data that indicates the type of special traffic control service. The marker may also include checked information or parameters and parameter values, such as the data rate, the multiplier, the allowance, a quality-of-service (QoS) indicator, or other variable that may applicable to the special traffic control service (e.g., overage, dropped packet, etc). Application detector 410 passes the marked packet to a stack 805 of Kernel space 423. For example, stack 805 may include logic of a protocol stack (e.g., a TCP/IP stack). Stack 805 may process the packet, and pass the marked packet to service classifier 415.

Figure 8B:
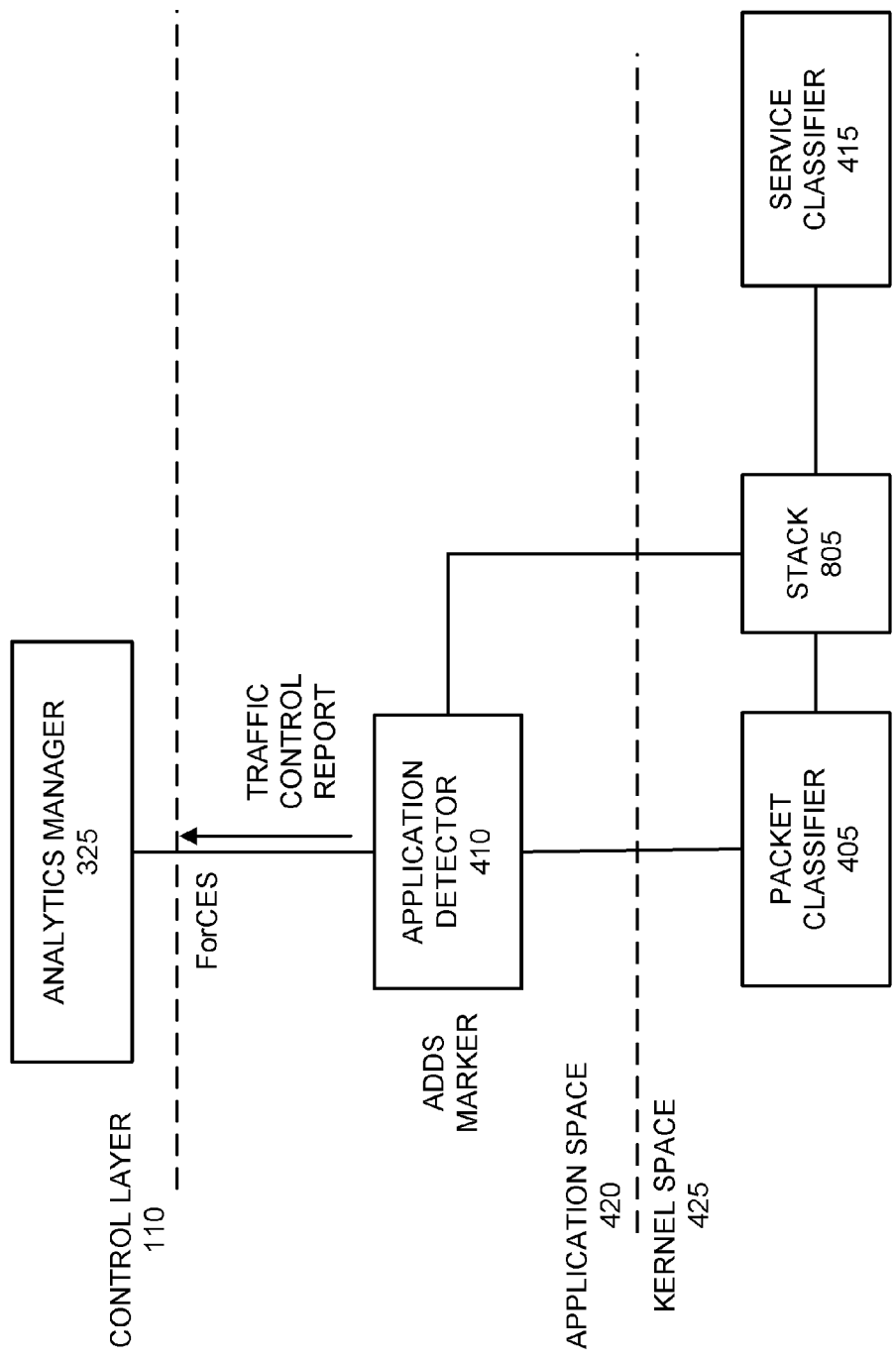

Referring to FIG. 8B, subsequent to passing the marked packet, application detector 410 may generate a traffic control report, which may include analytics data pertaining to the packet. Application detector 410 may transmit the traffic control report, via a control plane and the ForCES interface, to analytics manager 325. Although not illustrated, in response to receiving the traffic control report, analytics manager 325 may queue the traffic control report, and transmit the traffic control report, via data engine 340, to database 350 (e.g., analytics database 370) for storage.

Figure 8C:
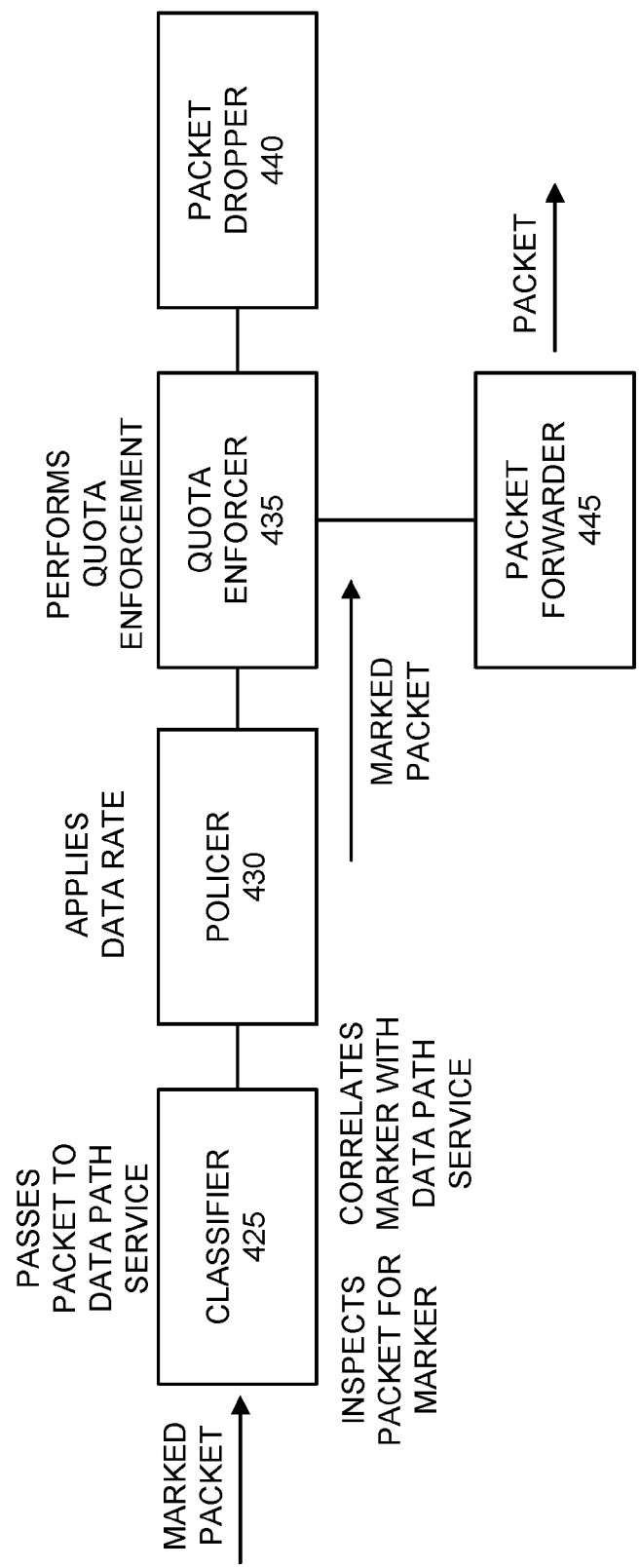

Referring to FIG. 8C, according to an exemplary implementation of service classifier 415, the marked packet is received by classifier 425. In response to receiving the marked packet, classifier 425 inspects the packet for the marker. In response to the packet inspection, classifier 425 obtains marker data, and determines the type of service to be applied to the packet. For example, classifier 425 may perform a lookup in a database using the marker data, and correlates the marker data to data stored in the database that indicates the service. According to this example, classifier 425 finds a match between the marker data and the data stored in the database, selects the correlated service data (e.g., parameters and parameter values), and passes the marked packet along a path that provides the selected service. Alternatively, classifier 425 may use the checked information to determine the parameters and the parameter values to be applied. For example, among multiple data path instances that may provide different data path services (e.g., different data rates, different quota/credits, different policies regarding overage, dropping packets, multipliers, allowances, etc.), classifier 425 selects the data path, which includes a policer 430, a quota enforcer 435, etc., that will provide the selected data path service. In response to receiving the marked packet, policer 430 applies a data rate, to the marked packet, that is provided under the selected data path service, and passes the marked packet to quota enforcer 435. In response to receiving the marked packet, quota enforcer 435 performs quota enforcement with respect to the packet. For example, quota enforcer 435 may calculate a deduction from the quota ascribed to end user 153 based on a multiplier included in the marked packet. According to this example, quota enforcer 435 passes the marked packet to packet forwarder 445. Packet forwarder 445 may or may not strip off the marker from the packet before transmitting the packet toward network 140.

Figure 8D:
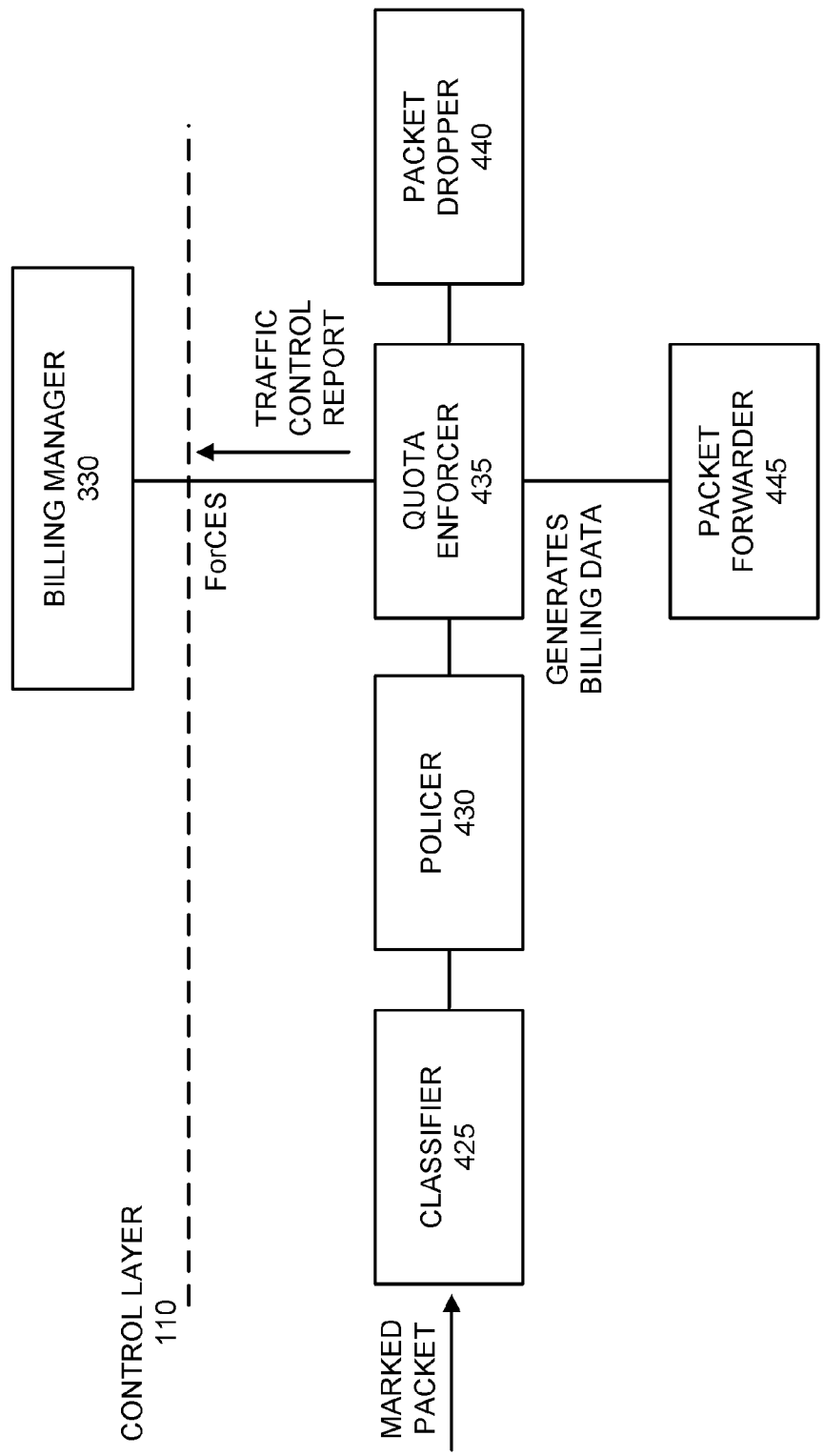

Referring to FIG. 8D, quota enforcer 435 may generate a traffic control report, which may include billing data pertaining to the packet. For example, the traffic control report may be implemented to include a charging data record (CDR). The CDR may be event-based, session-based, or based on another type of chargeable attribute. Quota enforcer 435 may validate, error-manage, and/or format the CDR in manner that allows billing domain 128 (e.g., the billing system) to immediately process the CDR. Alternatively, billing manager 330 or data engine 340 may perform various pre-processing of the CDRs before transmittal to billing domain 128. The traffic control report may also include other data indicative of the traffic control service applied (e.g., data rate, etc.). Quota enforcer 435 may transmit the traffic control report, via a control plane and the ForCES interface, to billing manager 330 and/or other elements in control layer 110 (e.g., analytics manager 325, etc). Although not illustrated, in response to receiving the traffic control report, billing manager 330 may queue the traffic control report, and transmit the traffic control report, via data engine 340, to database 350 (e.g., billing database 355) for storage.

Although FIGS. 8A-8D illustrate an exemplary process of the traffic control service at infrastructure layer 115, according to other embodiments, the process may include additional operations, fewer operations, and/or different operations than those illustrated in FIGS. 8A-8D, and described herein.

Figure 9A:
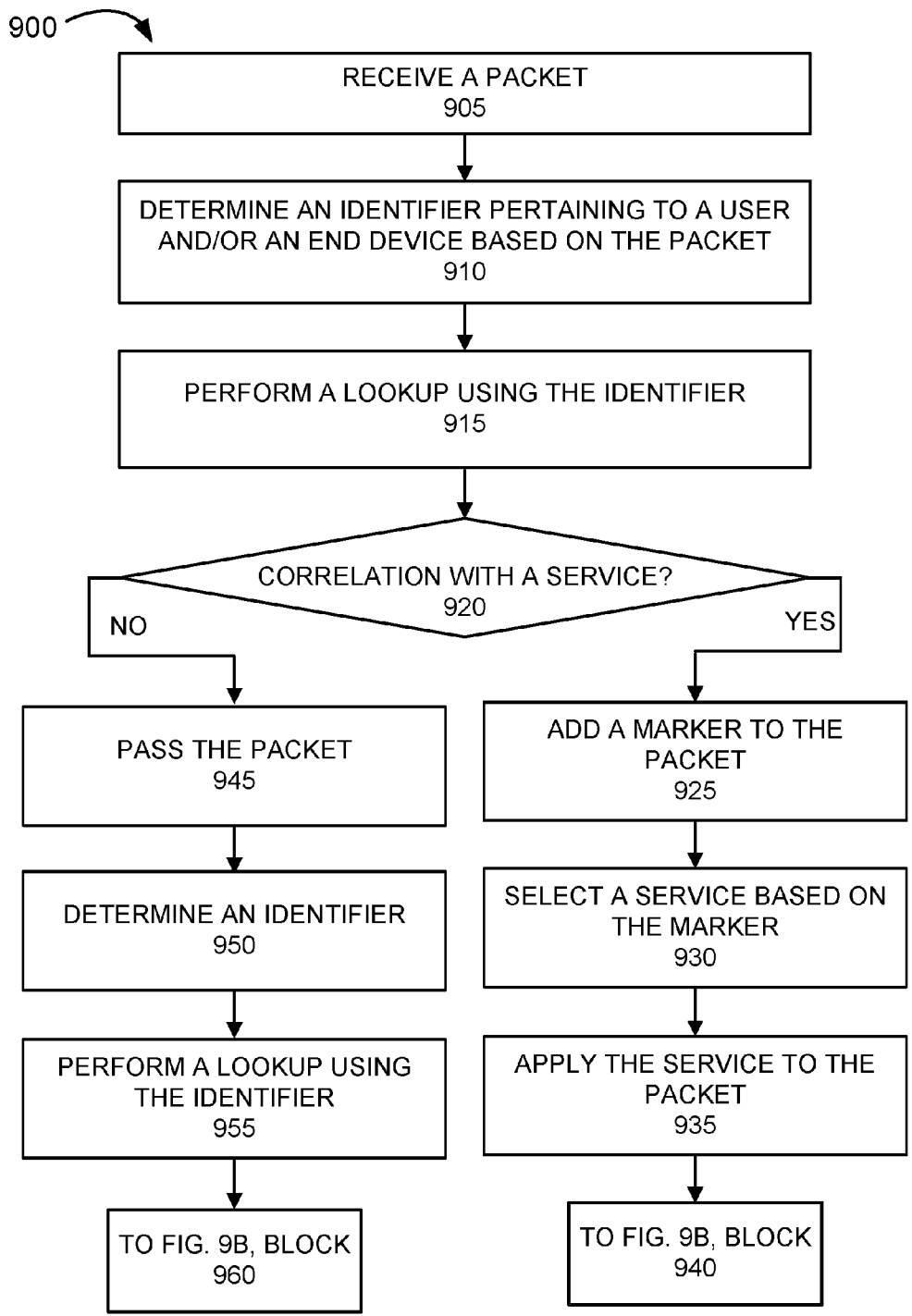
FIGS. 9A and 9B are flow diagrams illustrating an exemplary process of an exemplary embodiment of the traffic control service.
Figure 9B:
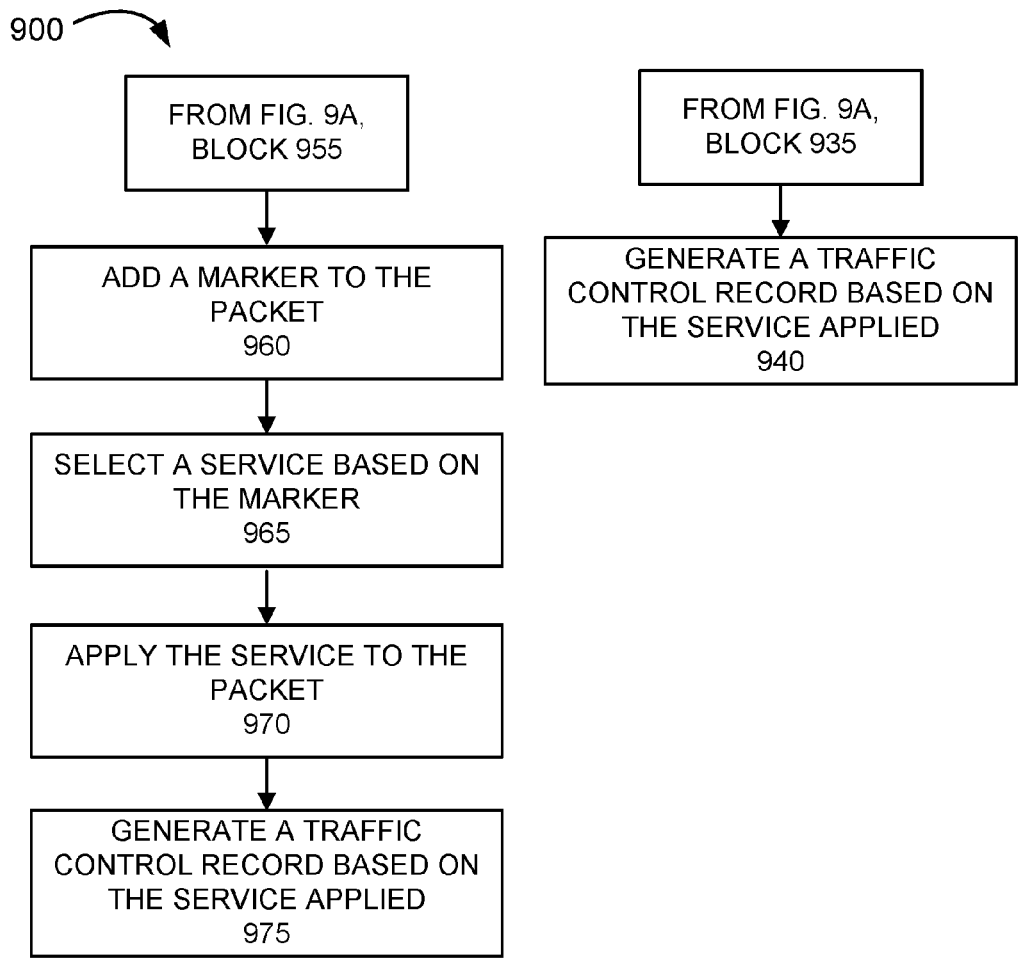

FIGS. 9A and 9B are flow diagrams illustrating an exemplary process 900 pertaining to the traffic control service. Process 900 is directed to a process previously described above with respect to FIGS. 8A-8D, as well as elsewhere in this description. According to an exemplary embodiment, programmable infrastructure 132 performs steps of process 900. For example, processor 510 executes software 520 to perform the steps illustrated in FIGS. 9A and 9B, and described herein. According to an exemplary embodiment, the steps are performed inline in the data path of subscriber data traffic. According to an exemplary implementation, the steps are performed by a line card of a network device.

Referring to FIG. 9A, block 905, a packet associated with an end device and/or an end user is received. For example, packet classifier 405 may receive the packet from end device 150 and access network 135, or the packet may be received from network 140 and destined to end device 150.

In block 910, an identifier pertaining to the end user and/or the end device is determined in response to receipt of the packet. For example, packet classifier 405 may perform packet inspection, and obtain a network address (e.g., a source address, a destination address) of end device 150.

In block 915, a lookup is performed using the identifier. For example, packet classifier 405 may search a database that correlates the network address of end device 150 with an identifier of a type of service. In block 920, it is determined whether the identifier correlates with a service. For example, packet classifier 405 may determine whether the network address of end device 150 is stored in the database. When it is determined that the identifier correlates to the service (block 920—YES), a marker is added to the packet (block 925). For example, packet classifier 405 adds the marker to the packet. By way of further example, the marker includes data that indicates the identifier of the type of service to be applied to the packet. Packet classifier 405 passes or transmits the marked packet to service classifier 415.

In block 930, the service is selected based on the marker. For example, service classifier 415 inspects the packet, and identifies the marker. Service classifier 415 performs a lookup in a database, and finds a match in a database that correlates the identifier of the type of service. In response to finding a match, service classifier 415 selects, for example, the type of service to be applied to the packet.

In block 935, the service is applied to the packet. For example, policer 430, quota enforcer 435, and packet forwarder 445, or policer 430, quota enforcer 435, and packet dropper 440 may provide the selected type of service. Referring to FIG. 9B, in block 940, a traffic control record is generated based on the service applied. For example, quota enforcer 435 may generate a billing record (e.g., a CDR) and other traffic control information (e.g., a quota data usage record, a dropped packet record, etc.) indicative of the traffic control pertaining to the packet based on the applied type of service.

Referring back to FIG. 9A, when it is determined that the identifier does not correlate to the service (block 920-NO), the packet is passed (block 945). For example, packet classifier 405 passes or transmits the packet to application detector 410.

In block 950, an identifier pertaining to the end device and/or the end user is determined in response to receipt of the packet. For example, application detector 410 may perform packet inspection, and obtain a network address (e.g., a source address, a destination address) of end device 150.

In block 955, a lookup is performed using the identifier. For example, application detector 410 may search a database that correlates the network address of end device 150 with an identifier of a type of service. The database may also correlate other parameters pertaining to the type of service (e.g., a multiplier, etc.). Depending on the type of service, applicant detector 410 may perform further packet inspection on the packet, which may be used in determining the type of service, or to allow the type of service to be subsequently applied. For example, content checker 406, application checker 407, location checker 408, and/or time checker 409 may generate or obtain checked information pertaining to the packet, end device 150, and/or end user 153. According to an exemplary implementation, application detector 410 may compare the checked information with parameters and parameter values belonging to the type of traffic control service. According to another exemplary implementation, application detector 410 may not compare the checked information with parameters and parameter values belonging to the type of traffic control service.

Referring to FIG. 9B, in block 960, a marker is added to the packet. For example, application detector 410 adds the marker to the packet. By way of further example, the marker includes data that indicates the identifier of the type of service to be applied to the packet. The marker may also include checked information or parametric data. Application detector 410 passes or transmits the marked packet to service classifier 415.

In block 965, the service is selected based on the marker. For example, service classifier 415 inspects the packet, and identifies the marker. Service classifier 415 performs a lookup in a database, and finds a match in a database that correlates the identifier of the type of service. In response to finding a match, service classifier 415 selects, for example, the type of service to be applied to the packet. According to an exemplary implementation, service classifier 415 may compare checked information, which is received from application detector 410, to parameters and parameter values of the selected type of service. According to another exemplary implementation, service classifier 415 may use parameters and parameter values, which may be received from application detector 410, for selection with the type of service.

In block 970, the service is applied to the packet. For example, policer 430, quota enforcer 435, and packet forwarder 445, or policer 430, quota enforcer 435, and packet dropper 440 may provide the selected type of service.

In block 975, a traffic control record is generated based on the service applied. For example, quota enforcer 435 may generate a billing record (e.g., a CDR) and other traffic control information (e.g., a quota data record, a dropped packet record, etc.) indicative of the traffic control pertaining to the packet based on the applied type of service.

Although FIGS. 9A and 9B illustrate an exemplary process 900 of the traffic control service, according to other embodiments, process 900 may include additional operations, fewer operations, and/or different operations than those illustrated in FIGS. 9A and 9B, and described herein.

Figure 10A:
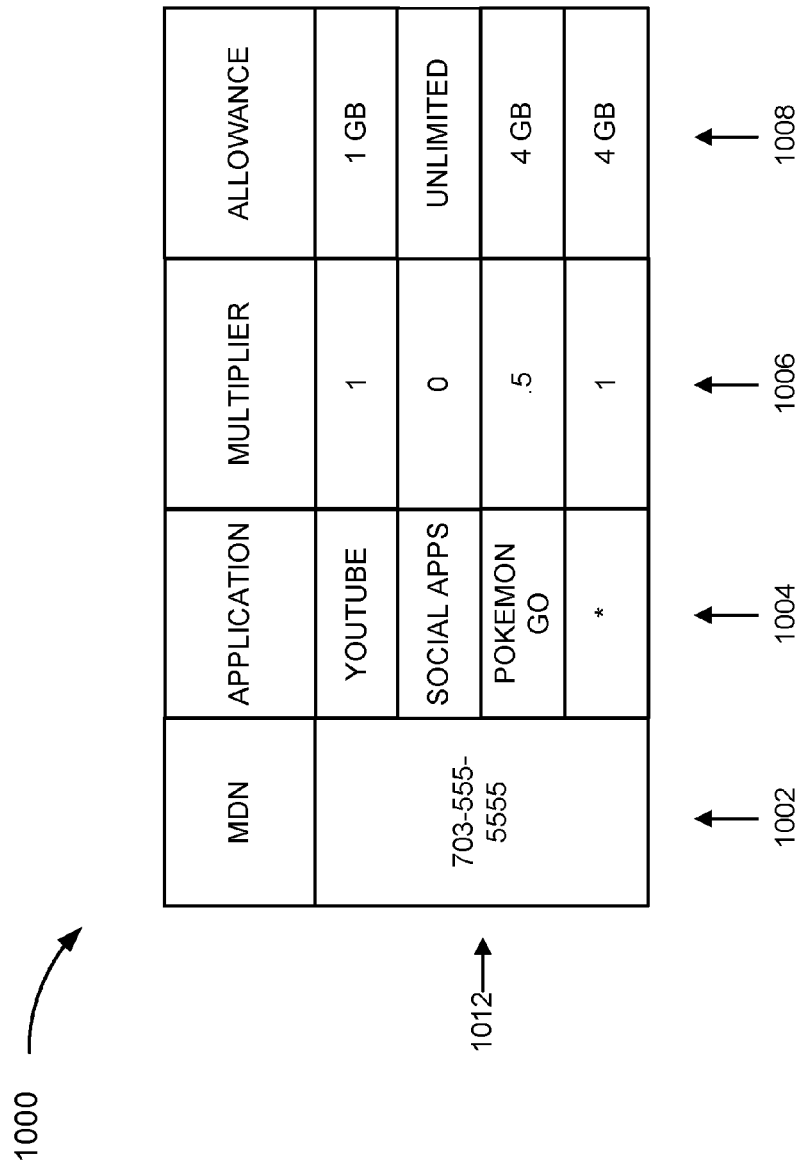
Figure 10B:
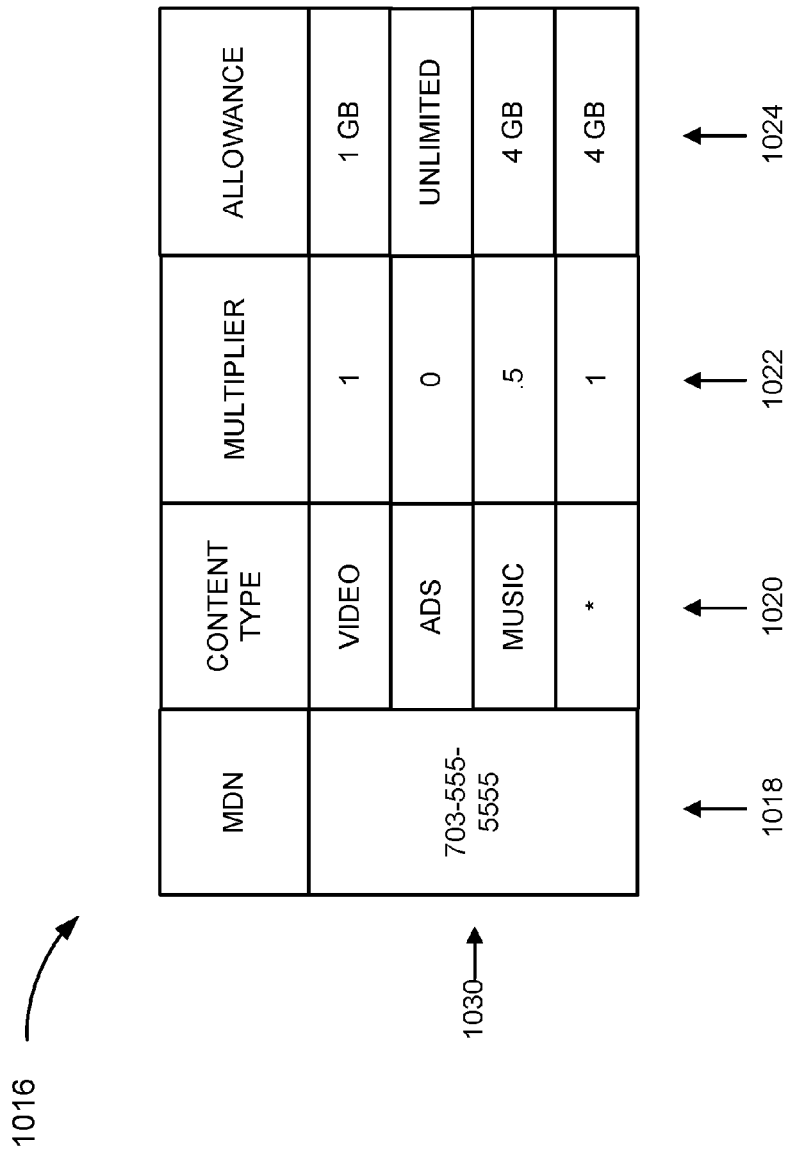
Figure 10D:
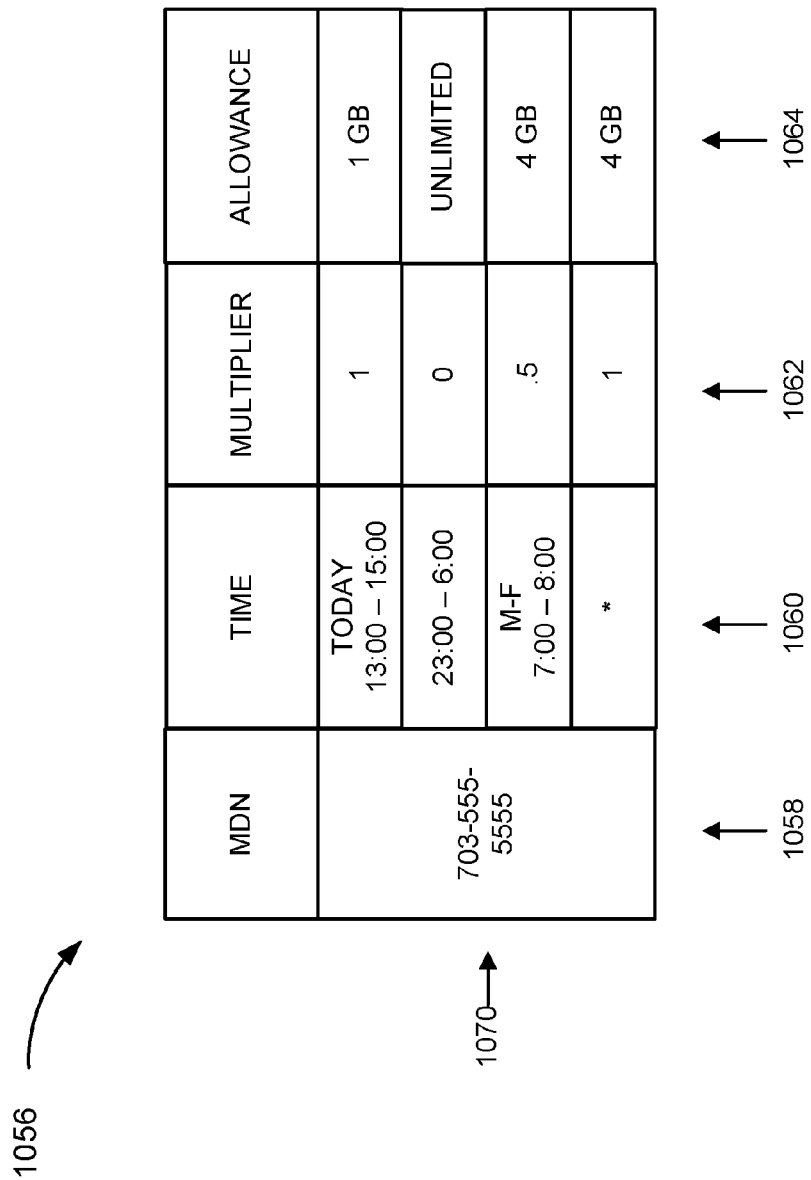

FIGS. 10A-10D are diagrams illustrating exemplary configuration data pertaining to exemplary embodiments of the traffic control service. For example, FIG. 10A illustrates a table 1000 that includes exemplary rules and/or parameter data pertaining to the application-based service, FIG. 10B illustrates a table 1016 that includes exemplary rules and/or parameter data pertaining to the content-based service, FIG. 10C illustrates a table 1036 that includes exemplary rules and/or parameter data pertaining to the location-based service, and FIG. 10D illustrates a table 1056 that includes exemplary rules and/or parameter data pertaining to the time-based service.

Referring to FIG. 10A, table 1000 includes an MDN field 1002, an application field 1004, a multiplier field 1006, and an allowance field 1008. As further illustrated, table 1000 includes a record 1012 that includes a grouping of parameters and parameter values. The parameters and the parameter values are exemplary. Additionally, according to other exemplary implementations, table 1000 may include additional and/or different instances of parameter/parameter value data.

MDN field 1002 stores a unique and static identifier of end device 150/end user 153. For example, the MDN field 1002 may store data indicating an MDN. Application field 1004 may store data indicating an application. Multiplier field 1006 may store data indicating a multiplier value that governs how data usage is counted. Allowance field 1008 may store data indicating a data usage allowance. By way of example, the application-based service may allow a 1 GB data allowance just for YouTube that has a multiplier of 1. According to another example, the application-based service may allow unlimited data usage for social applications (e.g., Facebook, Twitter, Instagram, and Pinterest) that has a multiplier of 0. According to yet another example, the application-based service may allow 4 GB data allowance for Pokemon Go that has a multiplier of 0.5.

Referring to FIG. 10B, table 1016 includes an MDN field 1018, a content type field 1020, a multiplier field 1022, and an allowance field 1024. As further illustrated, table 1016 includes a record 1030 that includes a grouping of parameters and parameter values. The parameters and the parameter values are exemplary. Additionally, according to other exemplary implementations, table 1016 may include additional and/or different instances of parameter/parameter value data.

MDN field 1018, multiplier field 1022, and allowance field 1024 may store data similar in nature to that previously described in relation to table 1000. Content type field 1020 may store data indicating a type of content. By way of example, the content-based service may allow a 1 GB data allowance just for video content that has a multiplier of 1. According to another example, the content-based service may allow unlimited data usage for advertisement (e.g., an Advertisement Free traffic control service) that has a multiplier of 0. According to yet another example, the content-based service may allow 4 GB data allowance for music that has a multiplier of 0.5.

Referring to FIG. 10C, table 1036 includes an MDN field 1038, a location field 1040, a multiplier field 1042, and an allowance field 1044. As further illustrated, table 1036 includes a record 1050 that includes a grouping of parameters and parameter values. The parameters and the parameter values are exemplary. Additionally, according to other exemplary implementations, table 1036 may include additional and/or different instances of parameter/parameter value data.

MDN field 1038, multiplier field 1042, and allowance field 1044 may store data similar in nature to that previously described in relation to table 1000. Location field 1040 may store data indicating a location. By way of example, the location-based service may allow a 1 GB data allowance just for a particular city (e.g., Boston) that has a multiplier of 1. According to another example, the location-based service may allow unlimited data usage for an event (e.g., a baseball game hosted in Fenway park) that has a multiplier of 0. According to yet another example, the location-based service may allow 4 GB data allowance for any restaurant or a particular chain of restaurant that has a multiplier of 0.5.

Referring to FIG. 10D, table 1056 includes an MDN field 1058, a time field 1060, a multiplier field 1062, and an allowance field 1064. As further illustrated, table 1056 includes a record 1070 that includes a grouping of parameters and parameter values. The parameters and the parameter values are exemplary. Additionally, according to other exemplary implementations, table 1056 may include additional and/or different instances of parameter/parameter value data.

MDN field 1058, multiplier field 1062, and allowance field 1064 may store data similar in nature to that previously described in relation to table 1000. Time field 1040 may store data indicating a time period. By way of example, the time-based service may allow a 1 GB data allowance just for today between the hours of 13:00-15:00 that has a multiplier of 1. According to another example, the location-based service may allow unlimited data usage between the hours of 23:00-6:00, every day (e.g., a night time plan), that has a multiplier of 0. According to yet another example, the time-based service may allow 4 GB data allowance during a commute-to-work time (e.g., the hours of 7:00-8:00, Monday-Friday) that has a multiplier of 0.5.

Figure 11A:
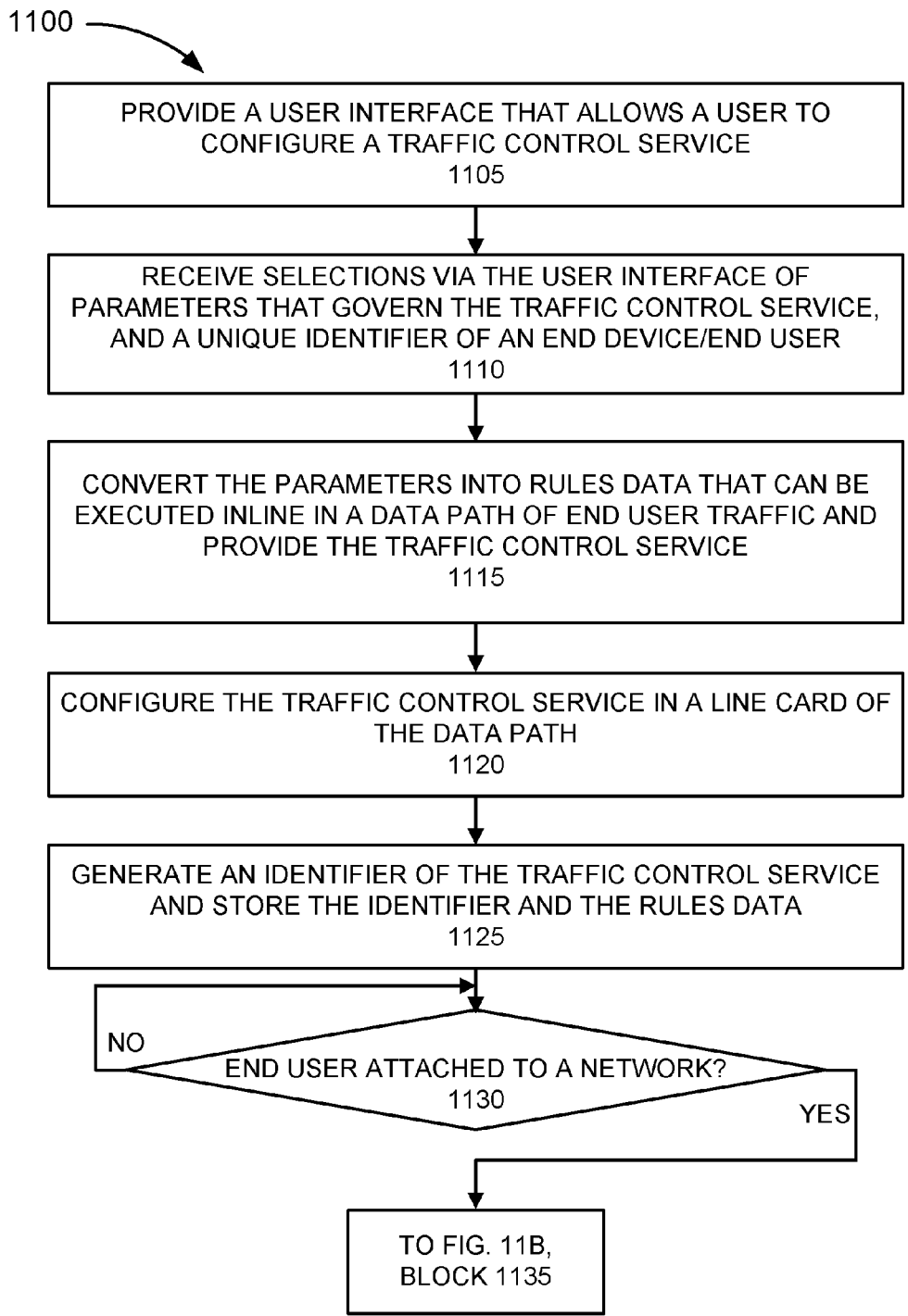
FIGS. 11A and 11B are flow diagrams illustrating another exemplary process of an exemplary embodiment of the traffic control service.
Figure 11B:
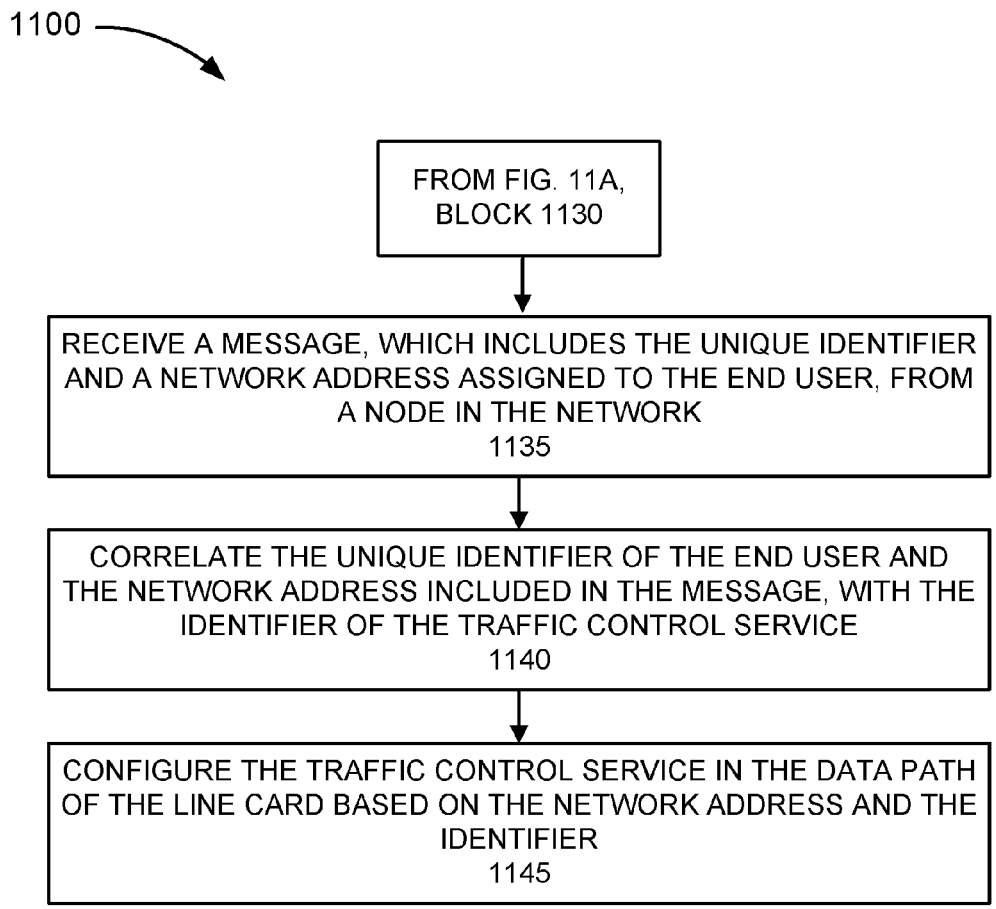

FIGS. 11A and 11B are flow diagrams illustrating an exemplary process 1100 pertaining to the traffic control service. Process 1100 is directed to a process previously described above with respect to FIGS. 6, 7A-7C, 8A-8D, as well as elsewhere in this description. According to an exemplary embodiment, user interface 120, cloud controller 124, and programmable infrastructure 132 perform steps of process 1100. For example, processor 510 executes software 520 to perform the steps illustrated in FIGS. 11A and 11B, and described herein.

Referring to FIG. 11A, in block 1105, a user interface, which allows a user to configure a traffic control service, is provided. For example, user interface 120 allows a user (e.g., a network administrator, an end user) to configure parameters and parameter values of a special traffic control service. The special traffic control service may include a content-based service, an application-based service, a time-based service, a location-based service, and/or a QoS-based service, as described herein.

In block 1110, selections of parameters, which govern the traffic control service, are received via the user interface, and a unique identifier of an end device/end user. For example, with reference to the content-based service, the user may select parameters, such as the allowance, the multiplier, the metric (e.g., data usage, data rate, etc.), and different contents and/or different content types. Additionally, for example, with reference to the application-based service, the user may select parameters, such as the allowance, the multiplier, the metric, and different applications and/or different types of applications. Also, for example, with reference to the time-based service, the user may select parameters, such as the allowance, the multiplier, the metric, and different time periods. Further, with reference to the location-based service, the user may select parameters, such as the allowance, the multiplier, the metric, and different locations. Still further, with reference to the QoS-based service, the user may select parameters, such as the allowance, the multiplier, the data rate, and one or multiple other variables (e.g., time, location, content, application, etc.). The special traffic control service may also allow the user to configure other parameters and parameter values pertaining to over-usage, dropping of packets, etc. Further, the user may also enter a unique identifier that identifies end device 150/end user 153 to which the traffic control service pertains.

In block 1115, the parameters are converted into rules data that can be executed inline in a data path of end user traffic and provide the traffic control service. For example, cloud controller 124 converts the parameters and the parameter values into rules data that can be executed in programmable infrastructure 132, as described herein.

In block 1120, the traffic control service is configured in a line card of the data path. For example, cloud controller 124 configures the rules data in a line card of programmable infrastructure 132, as described herein. The line card may include application space 420 and Kernel space 423.

In block 1125, an identifier of the traffic control service is generated, and the identifier and the rules data are stored. For example, cloud controller 124 may generate an identifier that identifies the traffic control service. Cloud controller 124 may store the identifier and the rules data in database 350, as previously described.

In block 1130, it is determined whether an end device/end user is attached to the network. For example, programmable infrastructure 132 may wait for end device 150/end user 150, to which the traffic control service pertains, to attach to access network 135 or be assigned a network address by access network 135. When it is determined that the end device/end user is not attached or assigned a network address (block 1130—NO), process 1100 may return to block 1130. When it is determined that the end device/end user is attached to the network or assigned a network address (block 1130—YES), a message is received from a node in the network. The message includes the unique identifier of the end device/end user and a network address assigned to the end device/end user (block 1135, FIG. 11B). For example, in response to an attachment to access network 135 or in response to the establishment of a bearer such that a network address is assigned to end device 150/end user 153, programmable infrastructure 132 receives the message and determines that end device 150/end user 153 is attached. According to an exemplary implementation, the message includes the assigned network address and the unique identifier that identifies end device 150/end user 153, as previously described.

In block 1140, the unique identifier of the end device/end user and the network address included in the message are correlated with the identifier of the traffic control service. For example, programmable infrastructure 132 may pass the message to cloud controller 124. Cloud controller 124 may query database 350 and correlate the identifier of the traffic control service with the unique identifier of the end device/end user.

In block 1140, the traffic control service is configured in the data path of the line card based on the network address and the unique identifier. For example, cloud controller 124 may configure programmable infrastructure 132 with a mapping between the network address of end device 150/end user 153, the identifier of the traffic control service, and the rules data of the traffic control service, as previously described.

Although FIGS. 11A and 11B illustrate an exemplary process 1100 of the traffic control service, according to other embodiments, process 1100 may include additional operations, fewer operations, and/or different operations than those illustrated in FIGS. 11A and 11B, and described herein.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while a series of blocks have been described with regard to the processes illustrated in FIGS. 9A, 9B, 11A, and 11B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 510, etc.), or a combination of hardware and software (e.g., software 520). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 510) of a computational device. A non-transitory storage medium includes one or more of the storage mediums described in relation to memory/storage 515.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:
   providing, by a first network device, a user interface that allows a user to configure a traffic control service, the traffic control service including at least one of a content-based service, an application-based service, a time-based service, a location-based service, or a quality-of-service-based service;
   receiving, by the first network device and via the user interface, selections of parameters that govern the traffic control service, and a unique identifier of an end user to which the traffic control service pertains;
   converting, by the first network device and in response to the selections, rules data that can be executed inline in a data path of end user traffic and can provide the traffic control service;
   configuring, by the first network device and in response to the converting, the traffic control service in a line card of a second network device included in the data path, wherein the configuring includes configuring the rules data and the unique identifier in the line card;
   generating, by the first network device, an identifier of the traffic control service;
   storing, by the first network device, the identifier and the rules data;
   receiving, by the first network device subsequent to the storing and in response to an attachment of the end user to a network, a message that include the unique identifier and a network address assigned to the end user;
   correlating, by the first network device, the unique identifier and the network address, with the identifier of the traffic control service; and
   configuring, by the first network device, the line card of the second network device with a mapping between the network address, the unique identifier, and the identifier of the traffic control service.

2. The method of claim 1, wherein the selections of the parameters configure the content-based service, and wherein the selections of the parameters include an allowance that indicates a maximum data usage, a multiplier that indicates a scalar for counting data usage for a specified content, and a content specifier that indicates the specified content, wherein the specified content is at least one of a type of content including one or more of video, music, or web, or a particular content.

3. The method of claim 1, wherein the selections of the parameters configure the application-based service, and wherein the selections of the parameters include an allowance that indicates a maximum data usage, a multiplier that indicates a scalar for counting data usage for a specified application, and an application specifier that indicates the specified application.

4. The method of claim 1, wherein the selections of the parameters configure the time-based service, and wherein the selections of the parameters include an allowance that indicates a maximum data usage, a multiplier that indicates a scalar for counting data usage for a specified time period, and a time period specifier that indicates the specified time period, wherein the specified time period includes at least one of a time period less than a day, or a time period less than a week.

5. The method of claim 1, wherein the selections of the parameters configure the location-based service, and wherein the selections of the parameters include an allowance that indicates a maximum data usage, a multiplier that indicates a scalar for counting data usage for a specified location, and a location specifier that indicates the specified location.

6. The method of claim 1, further comprising:
   receiving, by the line card of the second network device in the data path of the end user traffic, a packet associated with the end user, the line card including an operating system space and an application space that are configured to provide the traffic control service, wherein the traffic control service includes an in-line quota enforcement service pertaining to the at least one of the content-based service, the application-based service, the time-based service, the location-based service, or the quality-of-service-based service;
   identifying, by the operating system space of the line card and in response to the receiving of the packet, an identifier of the end user that is included in the packet, wherein the identifier of the end user is the network address;
   determining, by the operating system space of the line card and in response to the identifying, whether a type of traffic control service to be applied to the packet can be determined;
   passing, by the operating system space to the application space of the line card, the packet in response to determining that the type of traffic control service cannot be determined; and determining, by the application space of the line card and in response to the passing, the type of traffic of traffic control service to be applied to the packet.

7. The method of claim 6, further comprising:
adding, by the application space of the line card, a marker to the packet, wherein the marker indicates an identifier of the type of traffic control service to be applied to the packet, and wherein the identifier of the type of traffic control service is the identifier of the traffic control service;
passing, by the application space to the operating system space of the line card, the packet and the marker;
providing, by the operating system space of the line card and in response to the passing of the packet and the marker, the type of traffic control service to the packet based on the marker, wherein the type of traffic control service includes the in-line quota enforcement service;
generating, by the operating system space of the line card and in response to the providing of the type of traffic control service, a traffic control record that includes a quota usage; and
transmitting, by the operating system space of the line card, and to the first network device, the traffic control record.

8. The method of claim 7, wherein the type of traffic service includes a data rate service and a charging record service, wherein the traffic control record includes a charging data record, and wherein the marker includes at least one of a parameter or a parameter value pertaining to the in-line quota enforcement service.

9. A system comprising:
a first network device, comprising:
a first communication interface;
a first memory, wherein the first memory stores first instructions; and
a first processor, wherein the first processor executes the first instructions to:
provide a user interface that allows a user to configure a traffic control service, the traffic control service including at least one of a content-based service, an application-based service, a time-based service, a location-based service, or a quality-of-service-based service;
receive, via the first communication interface and the user interface, selections of parameters that govern the traffic control service, and a unique identifier of an end user to which the traffic control service pertains;
convert, in response to the selections, rules data that can be executed inline in a data path of end user traffic and can provide the traffic control service;
configure, via the first communication interface and in response to the conversion, the traffic control service in a line card of a second network device included in the data path, wherein the configuration includes the rules data and the unique identifier in the line card;
generate an identifier of the traffic control service;
store the identifier and the rules data;
receive, via the first communication interface and subsequent to the storage and in response to an attachment of the end user to a network, a message that include the unique identifier and a network address assigned to the end user;
correlate the unique identifier and the network address, with the identifier of the traffic control service; and
configure the line card of the second network device with a mapping between the network address, the unique identifier, and the identifier of the traffic control service.

10. The system of claim 9, wherein the selections of the parameters configure the content-based service, and wherein the selections of the parameters include an allowance that indicates a maximum data usage, a multiplier that indicates a scalar for counting data usage for a specified content, and a content specifier that indicates the specified content, wherein the specified content is at least one of a type of content including one or more of video, music, or web, or a particular content.

11. The system of claim 9, wherein the selections of the parameters configure the application-based service, and wherein the selections of the parameters include an allowance that indicates a maximum data usage, a multiplier that indicates a scalar for counting data usage for a specified application, and an application specifier that indicates the specified application.

12. The system of claim 9, wherein the selections of the parameters configure the time-based service, and wherein the selections of the parameters include an allowance that indicates a maximum data usage, a multiplier that indicates a scalar for counting data usage for a specified time period, and a time period specifier that indicates the specified time period, wherein the specified time period includes at least one of a time period less than a day, or a time period less than a week.

13. The system of claim 9, wherein the selections of the parameters configure the location-based service, and wherein the selections of the parameters include an allowance that indicates a maximum data usage, a multiplier that indicates a scalar for counting data usage for a specified location, and a location specifier that indicates the specified location.

14. The system of claim 9, further comprising the line card of the second network device, the line card comprising:
an operating system space; and
an application space, wherein the operating system space and the application space are configured to provide the traffic control service, wherein the traffic control service includes an in-line quota enforcement service pertaining to the at least one of the content-based service, the application-based service, the time-based service, the location-based service, or the quality-of-service-based service;
a memory, wherein the memory stores instructions; and
a processor, wherein the processor executes the instructions to:
receive in the data path of the end user traffic, by the operating system space, a packet associated with the end user;
identify, by the operating system space, in response to the receipt of the packet, an identifier of the end user that is included in the packet, wherein the identifier of the end user is the network address;
determine, by the operating system space and in response to the identification of the end user, whether a type of traffic control service to be applied to the packet can be determined;
pass, by the operating system space to the application space, the packet in response to a determination that the type of traffic control service cannot be determined; and determine, by the application space and in response to the pass, the type of traffic of traffic control service to be applied to the packet.

15. The system of claim 14, wherein the processor further executes the instructions to:
add, by the application space, a marker to the packet, wherein the marker indicates an identifier of the type of traffic control service to be applied to the packet, and wherein the identifier of the type of traffic control service is the identifier of the traffic control service;
pass, by the application space to the operating system space, the packet and the marker;
provide, by the operating system space and in response to the pass of the packet and the marker, the type of traffic control service to the packet based on the marker, wherein the type of traffic control service includes the in-line quota enforcement service;
generate, by the operating system space and in response to the provision of the type of traffic control service, a traffic control record that includes a quota usage; and
transmit, by the operating system space and to the first network device, the traffic control record.

16. The system of claim 15, wherein the type of traffic service includes a data rate service and a charging record service, wherein the traffic control record includes a charging data record, and wherein the marker includes at least one of a parameter or a parameter value pertaining to the in-line quota enforcement service.

17. A non-transitory, computer-readable storage medium storing instructions executable by a processor of a computational device, which when executed cause the computational device to:
provide a user interface that allows a user to configure a traffic control service, the traffic control service including at least one of a content-based service, an application-based service, a time-based service, a location-based service, or a quality-of-service-based service;
receive, via the user interface, selections of parameters that govern the traffic control service, and a unique identifier of an end user to which the traffic control service pertains;
convert, in response to the selections, rules data that can be executed inline in a data path of end user traffic and can provide the traffic control service;
configure, in response to the conversion, the traffic control service in a line card of a network device included in the data path, wherein the configuration includes the rules data and the unique identifier in the line card;
generate an identifier of the traffic control service;
store the identifier and the rules data;
receive, subsequent to the storage and in response to an attachment of the end user to a network, a message that include the unique identifier and a network address assigned to the end user;
correlate the unique identifier and the network address, with the identifier of the traffic control service; and
configure the line card of the network device with a mapping between the network address, the unique identifier, and the identifier of the traffic control service.

18. The non-transitory, computer-readable medium of claim 17, wherein the selections of the parameters configure the content-based service, and wherein the selections of the parameters include an allowance that indicates a maximum data usage, a multiplier that indicates a scalar for counting data usage for a specified content, and a content specifier that indicates the specified content, wherein the specified content is at least one of a type of content including one or more of video, music, or web, or a particular content.

19. The non-transitory, computer-readable storage medium of claim 17, further storing instructions executable by the processor of the computational device, which when executed cause the computational device to:
receive in the data path of the end user traffic, by an operating system space, a packet associated with the end user,
identify, by the operating system space, in response to the receipt of the packet, an identifier of the end user that is included in the packet, wherein the identifier of the end user is the network address;
determine, by the operating system space and in response to the identification of the end user, whether a type of traffic control service to be applied to the packet can be determined;
pass, by the operating system space to an application space, the packet in response to a determination that the type of traffic control service cannot be determined;
determine, by the application space and in response to the pass, the type of traffic of traffic control service to be applied to the packet;
add, by the application space, a marker to the packet, wherein the marker indicates an identifier of the type of traffic control service to be applied to the packet, and wherein the identifier of the type of traffic control service is the identifier of the traffic control service;
pass, by the application space to the operating system space, the packet and the marker;
provide, by the operating system space and in response to the pass of the packet and the marker, the type of traffic control service to the packet based on the marker, wherein the type of traffic control service includes an in-line quota enforcement service pertaining to the at least one of the content-based service, the application-based service, the time-based service, the location-based service, or the quality-of-service-based service;
generate, by the operating system space and in response to the provision of the type of traffic control service, a traffic control record that includes a quota usage; and
transmit, by the operating system space, the traffic control record.

20. The non-transitory, computer-readable storage medium of claim 19, wherein the type of traffic service includes a data rate service and a charging record service, wherein the traffic control record includes a charging data record, and wherein the marker includes at least one of a parameter or a parameter value pertaining to the in-line quota enforcement service, and the medium further storing instructions executable by the processor of the computational device, which when executed cause the computational device to:
forward the packet towards a destination of the packet.

* * * * *